United States Patent [19]
Tagawa et al.

[11] Patent Number: 5,738,429
[45] Date of Patent: Apr. 14, 1998

[54] PORTABLE PROJECTION DISPLAY APPARATUS

[75] Inventors: Takao Tagawa, Kashihara; Masayuki Katagiri, Ikoma; Hitoshi Nohno, Nara, all of Japan

[73] Assignee: Sharp Kabushiki Kaisha, Osaka, Japan

[21] Appl. No.: 462,882

[22] Filed: Jun. 5, 1995

[30] Foreign Application Priority Data

Jun. 28, 1994 [JP] Japan ..................... 6-146257
Apr. 28, 1995 [JP] Japan ..................... 7-106188

[51] Int. Cl.$^6$ ..................... G03B 21/14
[52] U.S. Cl. ..................... 353/122; 353/42
[58] Field of Search ..................... 353/122, 42, 101; 345/182, 183

[56] References Cited

U.S. PATENT DOCUMENTS

| | | | |
|---|---|---|---|
| 4,808,980 | 2/1989 | Drumm | 353/42 |
| 4,846,694 | 7/1989 | Erhardt | 353/122 |
| 4,953,971 | 9/1990 | Highfill | 353/122 |
| 5,114,224 | 5/1992 | Miyamoto et al. | 353/122 |
| 5,235,363 | 8/1993 | Vogeley et al. | 353/122 |
| 5,400,095 | 3/1995 | Minich et al. | 353/122 |
| 5,422,693 | 6/1995 | Vogeley et al. | 353/42 |

FOREIGN PATENT DOCUMENTS

| | | |
|---|---|---|
| 0199526 | 10/1986 | European Pat. Off. . |
| 0515015 | 11/1992 | European Pat. Off. . |
| 0601837 | 6/1994 | European Pat. Off. . |
| 329193 | 11/1987 | Japan . |
| 1128335 | 9/1989 | Japan . |
| 3167621 | 7/1991 | Japan . |
| 4299727 | 10/1992 | Japan . |
| 540453 | 2/1993 | Japan . |
| 5165568 | 7/1993 | Japan . |
| 5224636 | 9/1993 | Japan . |
| 6236236 | 8/1994 | Japan . |

*Primary Examiner*—William Dowling

[57] ABSTRACT

The present projection display apparatus includes an illumination source, an LCD panel including a polarizing plate, a light projecting and receiving combinational lens, a screen, a light pen, a detection-use polarizing plate, a CCD, and a control circuit for controlling an operation of the LCD panel upon receiving a signal from the CCD. The combinational lens throws light of a display image from the LCD panel to project the light on the screen. Meanwhile, the lens receives light from the display image and luminescent spot light from the pen to focus them on the LCD panel and then reflect the same to make them incident on the CCD via the detection-use polarizing plate. The detection-use polarizing plate does not transmit the light of the display image.

37 Claims, 16 Drawing Sheets

PORTABLE PROJECTION DISPLAY APPARATUS

BACKGROUND OF THE INVENTION

1. Field of the Invention

The present invention relates to a projection display apparatus for use in projecting an image on a large-size projection screen in a remote electronic conference by means of a communication line, a presentation of a commodity for explanation, a remote instruction system, or the like.

2. Description of the Prior Art

There has been conventionally proposed an apparatus which enlargingly projects an image from a personal computer or the like displayed on a display device such as an LCD panel on a large-size projection screen, and allows an explainer to manually write necessary matters and designate icons on the projected image by means of an input pen or the like in a conference or the like.

For instance, in a projection display apparatus of a first prior art as shown in FIG. 12, an LCD panel 203 and a transparent tablet 204 capable of receiving an input from a pen are superposed on an original document table 202 of an overhead projector (referred to as an OHP hereinafter) 201 (refer to, for example, Japanese Utility Model Laid-open Publication No. HEI 1-128335). When an operator performs a handwriting operation on the tablet 204 by means of a pen 205, position data of the pen 205 is transmitted to an image processor comprised of a computer (not shown). Then, the image processor displays an image based on the handwriting operation of the pen 205 on the LCD panel 203 based on the above-mentioned position data. Then, the image on the LCD panel 203 is enlargedly projected on a projection screen 208 by way of a projection lens 206 and a reflection mirror 207.

In a projection display apparatus of a second prior art as shown in FIG. 13, an LCD panel 213 is placed on an original document table 212 of an OHP 211, and a tablet capable of receiving an input from a pen is used as a projection screen 218 (refer to, for example, Japanese Utility Model Publication No. HEI 3-29193). When an operator performs a handwriting operation on the projection screen 218 by means of a pen 215, the handwriting position data is transmitted to an image processor comprised of a computer (not shown). The image processor displays an image based on the handwriting operation with the pen 215 on the LCD panel 213 based on the above-mentioned position data. The image is enlargedly projected on the projection screen 218.

Further, in a projection display apparatus of a third prior art as shown in FIG. 14, an OHP 221, an electronic image pickup camera 230, and a light pen 225 provided internally with an illumination source are used in combination (refer to, for example, Japanese Patent Laid-Open Publication No. HEI 4-299727). Light from the light pen 225 impinges on a projection screen 228, and the light is converged by an image pickup lens 229 of the electronic image pickup camera 230, thereby obtaining the coordinate position of a luminescent spot image illuminated on the projection screen 228.

There is a fourth prior art as shown in FIG. 15. The present prior art is an apparatus disclosed in Japanese Patent Laid-Open Publication No. HEI 4-299727, in which light from a high-intensity projection lamp 411 is converged by a Fresnel lens 412, and a display image from an LCD panel 413 is enlarged by a projection lens 414 to be projected on a screen 415. On the other hand, a plurality of light pens 416 can project an infra-red light beam emitted from an illumination source such as an LED on a desired input position of the screen 415. Light of a display image on the screen 415 and the above-mentioned infra-red light beam are converged by a reduction lens 417. Then, only the infra-red light beam is extracted by an infra-red light filter 418, and the extracted infra-red light is converged on a position detecting photodiode 420. The position detecting photodiode 420 detects the position of each light pen 416 by detecting the position of the infra-red light beam.

There is a fifth prior art as shown in FIG. 16. The present prior art is an apparatus disclosed in Japanese Patent Laid-Open Publication No. HEI 5-224636, in which light from an illumination source 511 is illuminated from a rear surface of an LCD panel 513 via a lens 512. A display image from the LCD panel 513 is transmitted through a beamsplitter mirror 514 and a projection lens 515, and then projected on a screen 516. On the other hand, a beam of radiation is generated from a radiation projector 517, and the beam of radiation is reflected on the screen 516. Light of the display image and the beam of radiation on the screen 516 travels through the projection lens 515. Then, only the beam of radiation is reflected on the beamsplitter mirror 514, and the reflected beam of radiation reaches sensor means 520 through a return image lens 518 and an image reduction lens 519. The sensor means 520 detects the position of the beam of radiation relative to the display image, and transmits the resultant information to a computer (not shown). The beam of radiation is implemented by infra-red light, while the beamsplitter mirror 514 is implemented by a dichroic mirror. Therefore, the beamsplitter mirror 514 is capable of projecting on the screen 516 visible light constituting the display image of the LCD panel 513, and selectively reflecting only the beam of radiation constituted by the infra-red light, thereby allowing the beam of radiation to be guided to the return image lens 518.

There is a sixth prior art as shown in FIG. 17. The apparatus of the present prior art is an apparatus disclosed in Japanese Patent Laid-Open Publication No. HEI 6-236236, in which white light from an illumination source is separated into three basic color components of blue light, green light and red light, and then applied to three separate optical valves. In detail, white light emitted from an illumination source 610 is converged by a reflecting mirror 611 and an optical system 612, and then collimated toward a modulation system. The white light firstly comes upon a first dichroic mirror 613 arranged inclinedly at an angle of 45°, and consequently the blue component is reflected. That is, light components having long wavelengths contained in the white light are transmitted through the first dichroic mirror 613. The light components transmitted through the first dichroic mirror 613 are then incident on a second dichroic mirror 614 arranged inclinedly at an angle of 45° in a similar manner. Consequently, the green component is reflected, and the red component is transmitted. Thus the white light from the illumination source 610 is separated into the three light components of the blue component, green component and red component.

Then, the blue component reflected on the first dichroic mirror 613 is reflected on a pure mirror 615 arranged at an angle of 45° toward an optical valve VB. The optical valve VB is an LCD device which decides the blue component out of the light components constituting a display image.

The green component reflected on the second dichroic mirror 614 is transmitted through an optical valve VG, so that the green component of the display image is decided.

The blue component and the green component formed by the optical valves VB and VG are combined with each other by a dichroic mirror 616, where only the green component is reflected, and the blue component having a wavelength shorter than that of the green component is transmitted.

Meanwhile, a red component of the image formed by an optical valve VR is reflected on a dichroic mirror 617 arranged at an angle of 45°. The dichroic mirror 617 reflects light components having a wavelength shorter than or equivalent to that of the red component, and transmits the infra-red light component. The infra-red light component is combined with the blue component and the green component of the display image by a dichroic mirror 618. The dichroic mirror 618 reflects the red component, and transmits the blue component and the green component having a wavelength shorter than that of the red component.

The blue, green and red components combined outputted from the dichroic mirror 618 are incident on an objective lens 619. The objective lens 619 displays on a projection screen 620 an image obtained by enlarging images formed by the three optical valves VB, VG and VR arranged optically at same distances from the objective lens 619.

Meanwhile, infra-red light emitted from an infra-red light radiator 621 operated by an observer forms an infra-red light spot on the projection screen 620. Although the infra-red light is radiated to the projection screen 620 from the opposite side of the projection display system in FIG. 17, the infra-red light may be radiated from the same side of the projection system.

A display image reflected on the projection screen 620 and the infra-red light refracted or reflected at the projection screen 620 pass through the objective lens 619 and reflects on the dichroic mirror 618 to reach the dichroic mirror 617. The dichroic mirror 617 transmits only the infra-red light and reflects the blue, green and red components from the display image. Then, the infra-red light transmitted through the dichroic mirror 617 is focused on an infra-red light surface detector 622. The infra-red light surface detector 622 is placed apart from the objective lens 619 at the same distance as those of the optical valves VB, VG and VR. The detector 622 can detect the position of the infra-red light spot on the projection screen 620 according to the position of the infra-red light focused on the infra-red light surface detector 622.

The aforementioned first through sixth prior arts have respective problems as follows.

First, the apparatus of the first prior art shown in FIG. 12 can project an image inputted by means of the pen in a room having a darkness in some degree so long as the OHP 201, the LCD panel 203, and the transparent tablet 204 are prepared without being restricted by the type of the projection screen 218.

However, the above-mentioned apparatus does not allow the operator to operate the pen on the image displayed on the projection screen 208 with a touch of direct handwriting. In other words, the inputting operation with the pen 205 is performed in a place separated apart in some degree from the projection screen 208. Therefore, for example, in performing a presentation in a conference, remote instruction or the like, each item or figure can not be explained in the place where the projection screen 208 is installed. The above fact requires the operator to return to the place where the OHP 201 is installed and then give an explanation by means of the pen 205, which is quite troublesome.

The apparatus of the second prior art shown in FIG. 13 can accept a direct input by means of the pen 215 on the projection screen 218. Therefore, while assuring an operation of the pen 215 with a touch of direct handwriting on the image displayed on the projection screen 218, the handwritten image is displayed, thus solving the drawback of the apparatus of the first prior art shown in FIG. 11.

However, in the apparatus of the second prior art, an input position with the pen 215 depends only on the position thereof on the projection screen 218, and has direct relation with the position of the image projected on the projection screen 218. Therefore, when the relative positional relation between the OHP 211 and the projection screen 218 is displaced as a result of, for example, abrupt movement of the OHP 211 while an image is projected on the projection screen 218, the position of the image which has been already inputted by means of the pen is displaced from a pen position in which an image will be entered, possibly impairing the continuity of any letter or figure. Furthermore, when the above-mentioned displacement occurs in designating a desired icon by means of the pen 215, there occurs a trouble that an icon different from the desired one is inadvertently designated. In order to avoid the trouble, the prior art shown in FIG. 13 requires a high accuracy in setting a relative positional relation between the OHP 211 and the projection screen 218.

Furthermore, the second prior art necessitates a special projection screen 218 capable of accepting a direct pen input. Therefore, when used in different places of conference, the projection screen 218 is required to be moved together with the OHP 211, thus lacking a portability.

In contrast to the second prior art, according to the third prior art shown in FIG. 14, an image in the LCD panel 223 placed on the original document table 222 of the OHP 221 is projected on the projection screen 228, while an image of the position of the light pen 225 obtained through a handwriting operation on the projection screen 228 is simultaneously picked up by the electronic image pickup camera 230, thereby obtaining the coordinate position of the luminescent spot image formed by the light pen 225. Therefore, no such special projection screen capable of inputting position data of the pen 215 as shown in FIG. 13 is necessitated as the projection screen 228.

Furthermore, in the third prior art, the image of the pen input position is picked up by the electronic image pickup camera 230, and depends on the relation between the position thereof and the position of the image projected on the projection screen 228. Therefore, even when the relative positional relation between the OHP 221 and the projection screen 228 is displaced, the continuity of the position of the image which has been already inputted with the pen and the pen position in which an image will be entered can be assured without being influenced by the positional displacement. Therefore, the third prior art can eliminate the drawbacks of the first prior art and the second prior art.

However, in the third prior art, the projection lens 226 for the image display operation with the OHP 221 and the lens 229 of the electronic image pickup camera 230 for the detection of the luminescent spot image are independently provided. Consequently, when the relative positional relation between the OHP 221 and the projection screen 228 is displaced, two focusing operations of focusing the projection lens 226 and focusing the image pickup lens 229 must be performed, resulting in a complicated handling. Furthermore, the image pickup lens 229 must be provided independently of the projection lens 226, resulting in a problem that the structure is complicated.

Furthermore, in the fourth prior art shown in FIG. 15, the projection lens 414 and the reduction lens 417 for detection use are provided independently. Therefore, when the distance between the projection lens 414 and the projection screen 415 or the angle of projection relative to the projection screen 415 is abruptly changed, the relation between a position in which the infra-red light beam from each light pen 416 is received by the reduction lens 417 and a position of an infra-red light spot formed by the light pen 416 on the projection screen 415 changes. As a result, there is a problem that the input position of the light pen 416 and the position of an image to be displayed on the input position sometimes do not coincide with each other.

Furthermore, in the fifth prior art shown in FIG. 16 and the sixth prior art shown in FIG. 17, the projection lenses 515 and 619 are made to concurrently receive a reflected light. Therefore, the positional displacement relative to the input position, i.e., the problem of the fourth prior art does not occur. However, in the fifth and sixth prior arts, the display image and the luminescent spot image from the light pen are separated apart from each other, and the expensive beamsplitter mirror 514 and dichroic mirror 618 for detecting the luminescent spot image are employed. The above-mentioned arrangement also results in a problem that a cost increase of the entire apparatus cannot be avoided. Furthermore, since the beamsplitter mirror 514 and the dichroic mirror 618 are arranged in the projection optical path, slight deterioration of the display image may occur due to reflection and scattering. Furthermore, light outgoing from the light pen must be separated from the display image by means of a dichroic mirror. The above-mentioned arrangement also results in a restriction that the light outgoing from the light pen must be invisible light. Therefore, in order to allow the operator to be able to review the position designated by the light pen on the projection screen, the light pen is required to emit an outgoing light including both invisible light and visible light. The above-mentioned matter also results in a cost increase.

SUMMARY OF THE INVENTION

The object of the present invention is therefore to provide a projection display apparatus which has a simple structure and an excellent portability and permits easy handling thereof while assuring prevention of a change in position between the display image which has been already displayed by the pen and the luminescent spot emitted from the pen without cost increase even when the installation place of the apparatus or a magnification of a lens is changed.

In order to achieve the aforementioned object, the present invention provides a projection display apparatus including:

display image forming means for forming a display image to be projected on a projection screen;

luminescent spot image forming means, having an illumination source for signal input use, for forming a luminescent spot image by projecting light from the illumination source for input use on the projection screen;

image focusing means, provided between the display image forming means and the projection screen, for focusing a display image on the projection screen upon receiving light from the display image forming means, and receiving reflection light from the projection screen;

luminescent spot image extracting means, provided between the image focusing means and the display image forming means, for extracting light from the luminescent spot image out of a received incident light from the image focusing means;

luminescent spot image detecting means for detecting the luminescent spot image upon receiving the light from the luminescent spot image extracted by the luminescent spot image extracting means; and display control means, responsive to a detection signal representing the luminescent spot image detected by the luminescent spot image detecting means, for controlling a display image forming operation of the display image forming means based on the detection signal.

In the present projection display apparatus, the display image from the display image forming means is emitted from the image focusing means and projected on the projection screen. Meanwhile, the light emitted from the luminescent spot image forming means forms a luminescent spot image on the projection screen. A reflection light from the display image and the luminescent spot image projected on the projection screen is incident on the luminescent spot image extracting means arranged between the image focusing means and the display image forming means from the image focusing means. The luminescent spot image extracting means extracts the light from the luminescent spot image out of the incident light. Then, the luminescent spot image detecting means receives the light from the luminescent spot image extracted by the luminescent spot image extracting means and detects the luminescent spot image. Then, the display control means receives a signal representing the luminescent spot image detected by the luminescent spot image detecting means, and controls the display image forming operation of the display image forming means.

That is, according to the present invention, the image focusing means concurrently has a role of projecting the display image on the projection screen and a role of taking in the light from the display image and the luminescent spot image formed on the projection screen. Then, the light from the luminescent spot image is extracted by the luminescent spot image extracting means, with which the luminescent spot image is detected by the luminescent spot image detecting means. Then the display control means controls the display image forming means based on the detection signal representing the luminescent spot image output from the luminescent spot image detecting means so as to control the display image forming operation.

Therefore, by manually operating the luminescent spot image forming means on the projection screen, light (or signal) circulates in order of luminescent spot image→image focusing means→luminescent spot image extracting means→luminescent spot image detecting means→display control means→image focusing means→projection screen, thereby allowing a trace of the luminescent spot image manually operated on the projection screen to be displayed on the projection screen. In other words, a desired image can be directly illustrated on the projection screen by operating the luminescent spot image forming means as if the means were a writing implement.

Furthermore, the image focusing means concurrently plays the role of projecting the display image on the projection screen and the role of taking in the light from the display image and the luminescent spot image formed on the projection screen. Therefore, according to the present invention, a simpler structure and a simpler focus adjustment of the image focusing means can be achieved in comparison with each prior art in which the image focusing means for image display use and the image focusing means for detecting the luminescent spot image are independently provided. Furthermore, according to the present invention, a displacement between the image focusing means for image display use and the image focusing means for detecting the luminescent spot image does not occur in contrast to each prior art in which the image focusing means for image display use and the image focusing means for detecting the luminescent spot image are independently provided.

Therefore, the positional relation between the display image which is already displayed on the projection screen and the luminescent spot image to be formed by the luminescent spot image forming means can be easily kept unchanged by virtue of the control of the display image by the display control means.

Therefore, according to the present invention, there can be provided a projection display apparatus which has a simple structure and an excellent portability and permits easy handling thereof while assuring prevention of a change in position between the display image which is already displayed through input with the pen and the luminescent spot emitted from the pen even when the state of installation is changed.

The present invention also provides a projection display apparatus including:

an illumination source for image display use;

display image forming means, including a liquid crystal display panel provided with a first polarizing plate and a second polarizing plate attached respectively to one and the other surfaces of a liquid crystal display cell, for forming a display image to be projected on a projection screen by transmitting light from the illumination source for image display use through the liquid crystal display panel, the first polarizing plate arranged opposite to the illumination source for image display use;

luminescent spot image forming means, having an illumination source for signal input use, for forming a luminescent spot image by projecting light from the illumination source for input use on the projection screen;

image focusing means, provided between the display image forming means and the projection screen, for focusing a display image on the projection screen upon receiving light from the display image forming means, and focusing reflection light received from the projection screen on the display image forming means;

a polarizing plate for detection use for transmitting light in a direction of polarization different from a direction of polarization of the second polarizing plate upon receiving light focused on the display image forming means by the image focusing means;

luminescent spot image detecting means for detecting the luminescent spot image upon receiving light transmitted through the polarizing plate for detection use;

display control means, responsive to a detection signal representing the luminescent spot image detected from the luminescent spot image detecting means, for controlling a display image forming operation of the liquid crystal display panel based on the detection signal; and luminescent spot image focusing means, provided between the polarizing plate for detection use and the luminescent spot image detecting means, for focusing an image received from the polarizing plate for detection use through reduction on the luminescent spot image detecting means.

That is, according to the present projection display apparatus, the display image forming means is implemented by the LCD panel provided with the first polarizing plate and the second polarizing plate attached respectively to the one and the other surfaces of the LCD cell. Meanwhile, the polarizing plate for detection use plays a role of taking out light from the luminescent spot image out of the light received from the image focusing means.

In the present projection display apparatus, the light from the LCD panel is transmitted through the image focusing means so as to focus a display image on the projection screen. Meanwhile, the luminescent spot image from the luminescent spot image forming means forms a luminescent spot image on the projection screen. The light from the display image and the luminescent spot image is incident on the image focusing means, transmitted through the image focusing means, and then incident on the second polarizing plate arranged opposite to the one surface of the LCD cell. The second polarizing plate transmits the light from the display image and reflects the light from the luminescent spot image. Then, the reflection light from the second polarizing plate is incident on the polarizing plate for detection use, and the light in a direction of polarization different from the direction of polarization of the second polarizing plate is transmitted. In other words, the light from the luminescent spot image is extracted by both the second polarizing plate and the polarizing plate for detection use, and then made incident on the luminescent spot image detecting means. Then, the luminescent spot image detecting means detects the luminescent spot image, and outputs the detection signal representing the luminescent spot image. Then, the display control means receives the detection signal representing the luminescent spot image, and controls the display image forming operation of the LCD panel based on the detection signal.

Therefore, by manually operating the luminescent spot image forming means on the projection screen, light (or signal) circulates in order of luminescent spot image→image focusing means→second polarizing plate→polarizing plate for detection use→luminescent spot image detecting means→display control means→image focusing means→projection screen, thereby allowing a trace of the luminescent spot image manually operated on the projection screen to be displayed on the projection screen. In other words, a desired image can be directly illustrated on the projection screen by operating the luminescent spot image forming means as if the means were a writing implement.

Furthermore, the image focusing means concurrently plays the role of projecting the display image on the projection screen and the role of taking in the light from the display image and the luminescent spot image formed on the projection screen. Therefore, similarly to the projection display apparatus of the first aspect of the present invention, there can be provided a projection display apparatus which has a simple structure and an excellent portability and permits easy handling thereof while assuring prevention of a change in position between the display image which is already displayed through input with the pen and the luminescent spot emitted from the pen even when the state of installation is changed.

Furthermore, the present projection display apparatus comprises luminescent spot image focusing means for focusing the image received from the polarizing plate for detection use through reduction on the luminescent spot image detecting means. Therefore, the light receiving surface of the luminescent spot image detecting means can be made smaller than the light receiving surface of the display image forming means. Therefore, cost reduction can be achieved. Furthermore, there is no need to provide an element such as a beam splitter mirror or a dichroic mirror which may cause a deterioration in display image quality in the projection light path. Therefore, a high-quality display image can be projected on the projection screen.

In an embodiment, the polarizing plate for detection use is arranged so that the direction of polarization of light of the polarizing plate for detection use is approximately perpendicular to the direction of polarization of light of the second polarizing plate. Therefore, the light transmitted through the polarizing plate for detection use includes almost no component of the display image light transmitted through the second polarizing plate. Therefore, the luminescent spot image detecting means can detect the luminescent spot image with high accuracy upon receiving the light transmitted through the polarizing plate for detection use.

A projection display apparatus of an embodiment of the present invention is a projection display apparatus including:

display image forming means for forming a display image to be projected on a projection screen;

luminescent spot image forming means, having an infra-red light emitting section for emitting an infra-red light, for forming an infra-red light luminescent spot image on the projection screen with the infra-red light from the infra-red light emitting section;

image focusing means, provided between the display image forming means and the projection screen, for focusing a display image on the projection screen upon receiving light from the display image forming means, and focusing reflection light received from the projection screen on the display image forming means;

an optical filter which is provided between the image focusing means and the display image forming means, and operates to receive light emitted from the image focusing means to the display image forming means, transmit light components having wavelengths in a region outside an infra-red region out of the light, and scatter light having a wavelength in the infra-red region;

luminescent spot image detecting means for detecting the luminescent spot image upon receiving the light component having a wavelength in the infra-red region scattered by the optical filter;

display control means, responsive to a detection signal representing the luminescent spot image detected from the luminescent spot image detecting means, for controlling a display image forming operation of the display image forming means based on the detection signal;

the optical filter being attached close to the display image forming means; and luminescent spot image focusing means, provided between the optical filter and the luminescent spot image detecting means, for focusing an image received from the optical filter through reduction on the luminescent spot image detecting means.

In the present apparatus, the luminescent spot image forming means is implemented by an infra-red light emitting section. Furthermore, an optical filter for scattering light having a wavelength in the infra-red region is provided between the image focusing means and the display image forming means.

Therefore, the luminescent spot image forming means forms an infra-red light luminescent spot image on the projection screen by outputting the infra-red light from the infra-red light emitting section. In regard to the light from the infra-red light luminescent spot image, light (or signal) circulates in order of image focusing means→optical filter→luminescent spot image detecting means→display control means→display image forming means →image focusing means→projection screen, thereby allowing a trace of the luminescent spot image manually operated on the projection screen to be displayed on the projection screen. In other words, a desired image can be directly illustrated on the projection screen by operating the luminescent spot image forming means as if the means were a writing implement.

Furthermore, in the present apparatus, the luminescent spot image is formed of an infra-red light. Therefore, the visible light from the display image and the infra-red light from the luminescent spot image can be easily surely separated from each other. Therefore, the luminescent spot image can be surely detected to allow a display image faithfully in correspondence with the luminescent spot image to be formed.

Furthermore, the optical filter is attached close to the display image forming means. Therefore, the defocus of the image formed on the optical filter can be minimized. Therefore, the luminescent spot image can be surely detected, and the display image can be formed faithfully in correspondence with to the luminescent spot image. Furthermore, since installing means and process for only the optical filter can be eliminated, a manufacturing cost reduction can be achieved.

Furthermore, the luminescent spot image focusing means provided between the optical filter and the luminescent spot image detecting means focuses the image received from the optical filter through reduction on the luminescent spot image detecting means. Therefore, the light receiving surface of the luminescent spot image detecting means can be reduced. Therefore, cost reduction can be achieved.

The present invention also provides a projection display apparatus including:

display image forming means for forming a display image to be projected on a projection screen;

luminescent spot image forming means, having an illumination source for signal input use, for forming a luminescent spot image by projecting light from the illumination source for input use on the projection screen, image focusing means, provided between the display image forming means and the projection screen, for focusing a display image on the projection screen upon receiving light from the display image forming means, and focusing reflection light received from the projection screen on the display image forming means;

a low-reflectance half mirror which is provided between the image focusing means and the display image forming means, and operates to receive light emitted from the image focusing means to the display image forming means, transmit a greater part of the received light, and reflect a smaller part of the received light;

image detecting means for detecting the luminescent spot image and the display image upon receiving light reflected on the half mirror; and display control means, responsive to an image detection signal representing the luminescent spot image and the display image detected from the image detecting means, for deriving an exclusive OR of the image detection signal and a display signal which has formed the display image on the display image forming means to extract a luminescent spot image signal representing only the luminescent spot image, and controlling a display image forming operation of the display image forming means based on the luminescent spot image signal.

The present projection display apparatus has a low-reflectance half mirror provided between the image focusing means and the display image forming means. The half mirror transmits a greater part of the light emitted from the image focusing means to the display image forming means. Meanwhile, the half mirror reflects a smaller part of the emitted light. The half mirror does not separate the luminescent spot image component and the display image component of the light from each other. Therefore, the light reflected on the half mirror includes the display image component and the luminescent spot image component. Therefore, upon receiving the reflection light from the half mirror, the image detecting means detects both the display image and the luminescent spot image. Then, upon receiving the image detection signal from the image detecting means, the display control means derives an exclusive OR of the image detection signal which has formed the display image on the display image forming means and the detection signal to extract a luminescent spot image signal representing only the luminescent spot image, and controls the display image forming operation of the display image forming means based on the luminescent spot image signal.

Therefore, similarly to the projection display apparatus of the first aspect of the present invention, according to the present projection display apparatus, a manual input position by means of the luminescent spot image forming means and a display position due to the manual input operation consistently coincide with each other even when the place of installation of the apparatus is moved or the magnification of the projected display image is changed, and an excellent portability is assured.

Furthermore, since the half mirror has a low reflectance and a high transmittance, the transmittance of the display image which travels from the display image forming means to the projection screen is high. Therefore, a reduction in luminance of the display image attributed to the existence of the half mirror is very small. Therefore, a display image assuring a good visibility can be projected on the projection screen.

In an embodiment, the image focusing means for focusing the image received from the half mirror through reduction on the image detecting means is provided between the half mirror and the image detecting means. In the present case, the light receiving area of the image detecting means can be reduced, and the image focusing means can be compacted. Therefore, cost reduction can be achieved.

Furthermore, in an embodiment, light scattering means for focusing the image received from the half mirror on the light scattering means itself is provided between the half mirror and the image detecting means. Therefore, by providing an image focusing means having a great aperture such that it efficiently collects the light from the image focused on the light scattering means, the image detecting means can detect a bright image having a small aberration.

Furthermore, in an embodiment, a Fresnel lens is provided between the half mirror and the image detecting means. Therefore, by providing the image focusing means in a position on which the image focused on the Fresnel lens is converged, the image detecting means can improve the use efficiency of the reflection light from the half mirror more than in the previous embodiment.

The present invention also provides a projection display apparatus including:

an illumination source for image display use;

display image forming means, including a liquid crystal display panel provided with a first polarizing plate and a second polarizing plate attached respectively to one and the other surfaces of a liquid crystal display cell, for forming a display image to be projected on a projection screen by transmitting light from the illumination source for image display use through the liquid crystal display panel, the first polarizing plate arranged opposite to the illumination source for image display use;

luminescent spot image forming means, having an illumination source for signal input use, for forming a luminescent spot image by projecting light from the illumination source for input use on the projection screen;

image focusing means, provided between the display image forming means and the projection screen, for focusing a display image on the projection screen upon receiving light from the display image forming means, and focusing reflection light received from the projection screen on the display image forming means;

a polarizing beam splitter which reflects light in a direction of polarization different from a direction of polarization of the second polarizing plate upon receiving light emitted from the image focusing means to the liquid crystal display panel;

luminescent spot image detecting means for detecting the luminescent spot image upon receiving light reflected by the polarizing beam splitter; and display control means, responsive to a detection signal representing the luminescent spot image detected from the luminescent spot image detecting means, for controlling a display image forming operation of the liquid crystal display panel based on the detection signal.

In the present apparatus, the display image forming means is implemented by an LCD panel, while the luminescent spot image forming means is implemented by an illumination source for signal input use. The polarizing beam splitter serves as the luminescent spot image extracting means.

Therefore, by manually operating the luminescent spot image forming means on the projection screen, light (or signal) circulates in order of luminescent spot image→image focusing means→polarizing beam splitter→luminescent spot image detecting means→display control means→polarizing beam splitter→image focusing means→projection screen, thereby allowing a trace of the luminescent spot image manually operated on the projection screen to be displayed on the projection screen. In other words, a desired image can be directly illustrated on the projection screen by operating the luminescent spot image forming means as if the means were a writing implement.

The present projection display apparatus may be further provided with reception image focusing means for focusing an image received from the polarizing beam splitter through reduction on the luminescent spot image detecting means between the polarizing beam splitter and the luminescent spot image detecting means. In the present case, the light receiving area of the luminescent spot image detecting means can be made smaller than the light receiving surface of the display image forming means. Therefore, cost reduction can be achieved.

In an embodiment, the illumination source of the luminescent spot image forming means generates a light of which direction of polarization is random. Therefore, the illumination source can frequently generate a light which is polarized in a direction in which the light is reflected by the polarizing beam splitter. Therefore, a frequency of detecting the light from the luminescent spot image by means of the luminescent spot image detecting means can be increased. Therefore, the luminescent spot image can be correctly detected to allow a display image faithful to the luminescent spot image can be displayed.

In another embodiment, the illumination source of the luminescent spot image forming means emits a circularly polarized light. Therefore, the illumination source can surely generate a light which is polarized in a direction in which the light is reflected by the polarizing beam splitter. Therefore, the luminescent spot image can be surely detected.

Furthermore, the present invention provides a projection display apparatus including:

an illumination source for image display use;

display image forming means, including a liquid crystal display panel provided with an image display polarizing plate attached to one surface of a liquid crystal display cell, for forming a display image to be projected on a projection screen by transmitting the light from the illumination source for image display use through the liquid crystal display panel, the image display polarizing plate arranged opposite to the illumination source for image display use;

luminescent spot image forming means, having an illumination source for signal input use, for forming a luminescent spot image by projecting light from the illumination source for input use on the projection screen;

image focusing means, provided between the display image forming means and the projection screen, for focusing a display image on the projection screen upon receiving light from the display image forming means, and focusing reflection light received from the projection screen on the display image forming means;

a polarizing beam splitter which is provided between the liquid crystal display panel and the image focusing means, and operates to polarize a display image light from the liquid crystal display panel in a specified direction of polarization, output the resulting polarized light to the image focusing means, receive light emitted from the image focusing means to the liquid crystal display panel, and reflect a light component in a direction of polarization different from the specified direction of polarization;

luminescent spot image detecting means for detecting the luminescent spot image upon receiving light reflected by the polarizing beam splitter; and display control means, responsive to a detection signal representing the luminescent spot image detected from the luminescent spot image detecting means, for controlling a display image forming operation of the liquid crystal display panel based on the detection signal.

The present apparatus differs from the previous embodiment in that the display image forming means is not provided with the second polarizing plate. The polarizing beam splitter concurrently plays a role of the display system for polarizing the display image light from the LCD panel in a specified direction of polarization and a role of a light receiving system for receiving the light emitted from the image focusing means to the LCD panel and reflecting the light in the direction of polarization different from the above-mentioned specified direction of polarization. Therefore, cost can be reduced in comparison with the previous embodiment.

The aforementioned projection display apparatuses may be each provided with reference image forming means which is fixed in a specified position relative to the display image forming means, and operates to output to the projection screen a reference light including light having a characteristic different from that of the light outputted from the luminescent spot image forming means, and form on the projection screen a reference image of which position relative to the display image formed by the display image forming means is fixed in a specific relation.

In the present case, by detecting the position of the luminescent spot image relative to the reference image by the luminescent spot image detecting means, the position of the luminescent spot image relative to the display image can be easily detected utilizing the reference image. Therefore, even when the position of the luminescent spot image relative to the display image is displaced, the position of the reference image relative to the display image can be easily corrected. Therefore, a display image faithful to the luminescent spot image can be displayed.

As described above, the projection display apparatus of the present invention is an apparatus operating by placing the light pen near the screen in enlargingly projecting an image on the screen, receiving an emission light emitted from the light emitting element provided at the tip end of the light pen on the screen, thus allowing a manual input with the light pen to be displayed- Since the apparatus is provided with the combinational lens which concurrently serves as a projection lens and a reception lens, a stable manual input can be consistently achieved in a specified position on the screen even when the place of installation of the apparatus is moved or the magnification of the lens is changed. The present invention will become more fully understood from the detailed description given hereinbelow and the accompanying drawings which are given by way of illustration only, and thus are not limitative of the present invention, and wherein:

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A projection display apparatus of the present invention will be described in detail based on several embodiments thereof with reference to the accompanying drawings.

First embodiment

Figure 1:
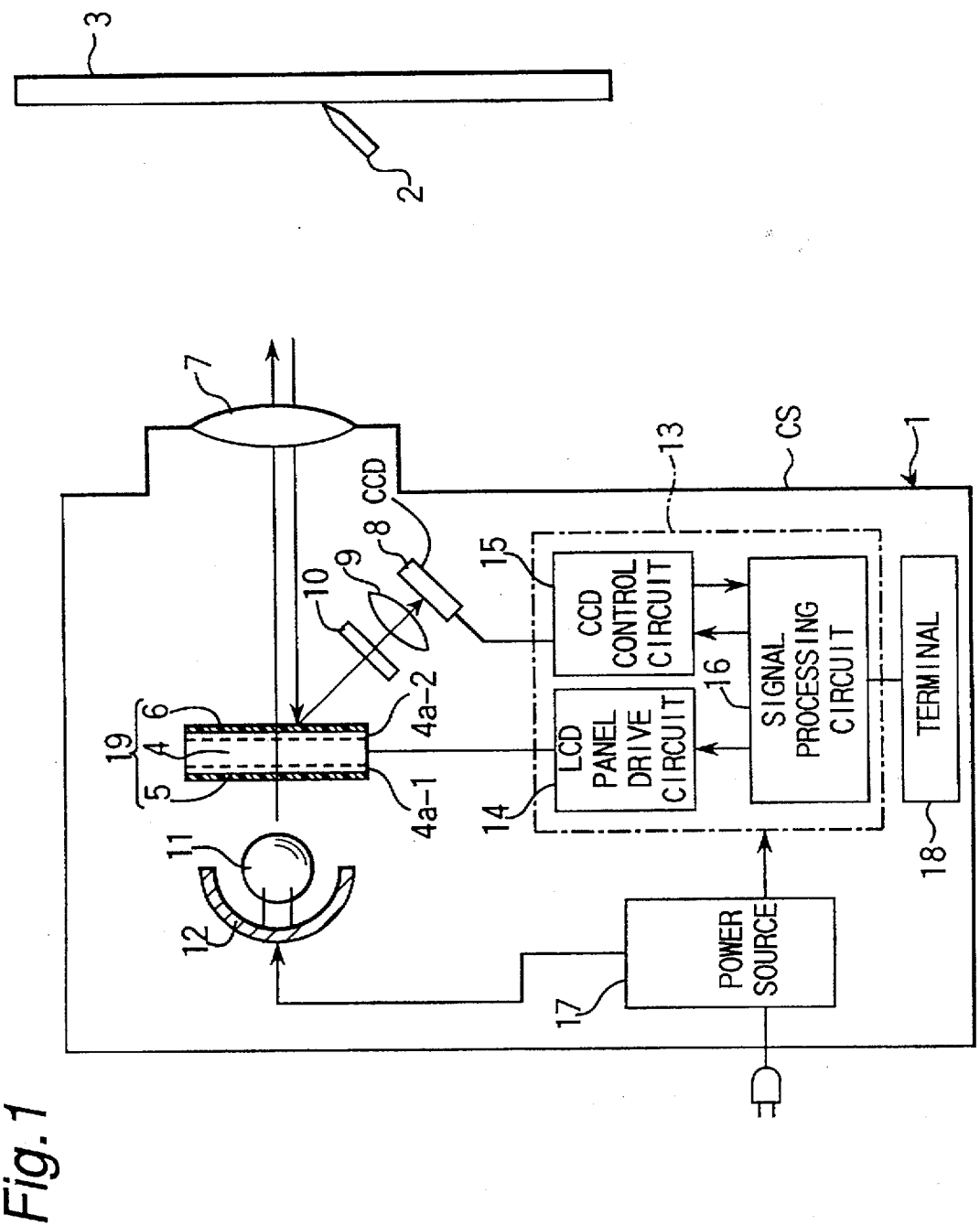
FIG. 1 is a schematic view of a projection display apparatus according to a first embodiment of the present invention.

FIG. 1 shows a first embodiment of the present invention. The first embodiment is a pen input function-integrated projection display apparatus including a projector main unit 1, a light pen 2, and a projection screen 3.

The projector main unit 1 comprises a projection-use illumination source 11, an LCD panel 19, a light projecting and receiving combinational lens 7, a detection-use polarizing plate 10, a detection lens 9, a solid-state charge-coupled device (referred to as a CCD hereinafter) 8, a control circuit 13, a power source 17, a terminal device 18, and a casing CS. In the casing CS are integrally stored the illumination source 11, LCD panel 19, light projecting and receiving combinational lens 7, detection-use polarizing plate 10, detection lens 9, CCD 8, control circuit 13, power source 17, and terminal device 18.

The projector main unit 1 has a reflection plate 12 which partially surrounds the projection-use illumination source 11. The projection-use illumination source 11 and the reflection plate 12 constitute a first illumination source. The illumination source 11 is preferably implemented by non-red heat means such as a metal halide discharge lamp taking the calorific value and the quantity of light into consideration. Since the reflection plate 12 is provided for efficiently throwing light from the illumination source 11 toward the LCD panel 19, it is properly formed of a metal or a material such as a paper or plastic film coated with a reflecting material.

The LCD panel 19 is arranged opposite to the illumination source 11 and the reflection plate 12 so as to receive the light from the illumination source 11 and the reflection plate 12. The LCD panel 19 has an LCD cell 4 filled sealedly with liquid crystal molecules, a first polarizing plate 5 and a second polarizing plate 6. The first polarizing plate 5 is bonded to one surface of the LCD cell 4 as opposed to the illumination source 11. The first polarizing plate 5 is a polarizing plate for linearly polarizing incident light. The second polarizing plate 6 is bonded to the other surface of the LCD cell 4. The first polarizing plate 5 has a first linear polarization direction, while the second polarizing plate 6 has a second linear polarization direction perpendicular to the first linear polarization direction. The LCD cell 4 has two supporting plates 4a-1 and 4a-2 and liquid crystals sealedly filled in a space between the supporting plates 4a-1 and 4a-2. A distance between the two supporting plates 4a-1 and 4a-2 is several micrometers. The supporting plates are each formed of a glass or plastic material. On the two supporting plates 4a-1 and 4a-2 are deposited LCD drive electrodes (not shown). To the drive electrodes is inputted a drive signal from an LCD panel drive circuit 14 of the control circuit 13. By inputting the drive signal to the drive electrodes, the direction of alignment of the liquid crystals changes.

The light projecting and receiving combinational lens 7 has a role of receiving light from the LCD panel 19 and focusing the light on the projection screen 3 as well as a role of receiving light from the projection screen 3 and focusing the light on the second polarizing plate 6.

The CCD 8 constitutes a reception image detector. It is to be noted that the reception image detector means may be implemented by a position sensitive device (PSD). The CCD 8 detects light from the luminescent spot image which is formed on the projection screen 3 by the light pen 2 via the light projecting and receiving combinational lens 7, the second polarizing plate 6, the detection-use polarizing plate 10 and the detection lens 9. The detection-use polarizing plate 10 is to transmit only light having one direction of polarization. The detection-use polarizing plate 10 is interposed between the CCD 8 and the LCD panel 19 as arranged in parallel with the light receiving surface of the CCD 8. Between the CCD 8 and the detection-use polarizing plate 10 is arranged the detection lens 9. The detection lens 9 is composed of a convex lens. Since the light projecting and receiving combinational lens 7 and the detection lens 9 are combined with each other in the present embodiment, a reduced focal length can be achieved in comparison with a case where the lens 7 is singly used, thereby allowing an increased reduction ratio of the light receiving system to be achieved. Therefore, as described hereinafter, an image formed by reducing the image on the projection screen 3 is input to the CCD 8. Consequently, the light receiving area of the CCD 8 can be made smaller than the light receiving area of the LCD panel 19. Therefore, the CCD 8 can be compacted, and cost reduction can be achieved. Furthermore, in place of the detection lens 9, a hologram for achieving focusing means for increasing the reduction ratio of the light receiving system may be provided.

The control circuit 13 has the LCD panel drive circuit 14 for driving the LCD panel 19, a CCD control circuit 15 for driving the CCD 8 and a signal processing circuit 16. The signal processing circuit 16 is implemented by a micro computer.

Though not shown, the signal processing circuit 16 has a CPU (Central Processing Unit) and a table memory for coordinate transformation and correction processes. The signal processing circuit 16 performs control of the LCD panel 19 and the CCD 8. Further, the signal processing circuit 16 performs a correction operation based on an image signal detected by the CCD 8 so that the position of the light pen 2 and the display position of the LCD panel 19 correspond with each other. Further, when an icon indicating contents of a process set within a display area is designated by the light pen 2, the signal processing circuit 16 executes the designated process. Further, the signal processing circuit 16 executes control for connection with the terminal device 18.

In the present embodiment, a read frequency of the CCD 8 driven by the CCD control circuit 15 may be set at a frequency approximately equal to the display frequency of the LCD panel 19 driven by the LCD panel drive circuit 14. The above-mentioned read frequency may be set at a frequency higher than the display frequency. When the read frequency is set higher than the display frequency, a read operation by the CCD 8 can be achieved with high accuracy. For instance, by setting the read frame frequency at 120 Hz when the display frame frequency is 60 Hz, detection of the position of the light pen 2 by the CCD 8 is performed every frame. Therefore, a detection rate per second is 120 points per second. In the present case, the above-mentioned arrangement seems meaningless at a glance since the display frame frequency is 60 Hz. However, for example, when an input pattern recognition operation is performed by obtaining the position of the light pen 2, the recognition rate increases according as the detection rate per second increases. Furthermore, as the read frame frequency is made greater than the display frame frequency, the accuracy of the coordinates to be detected increases by obtaining mean coordinates of a plurality of coordinates in continuation. Therefore, the pen position can be displayed on the projection screen 3 correctly.

Figure 2:
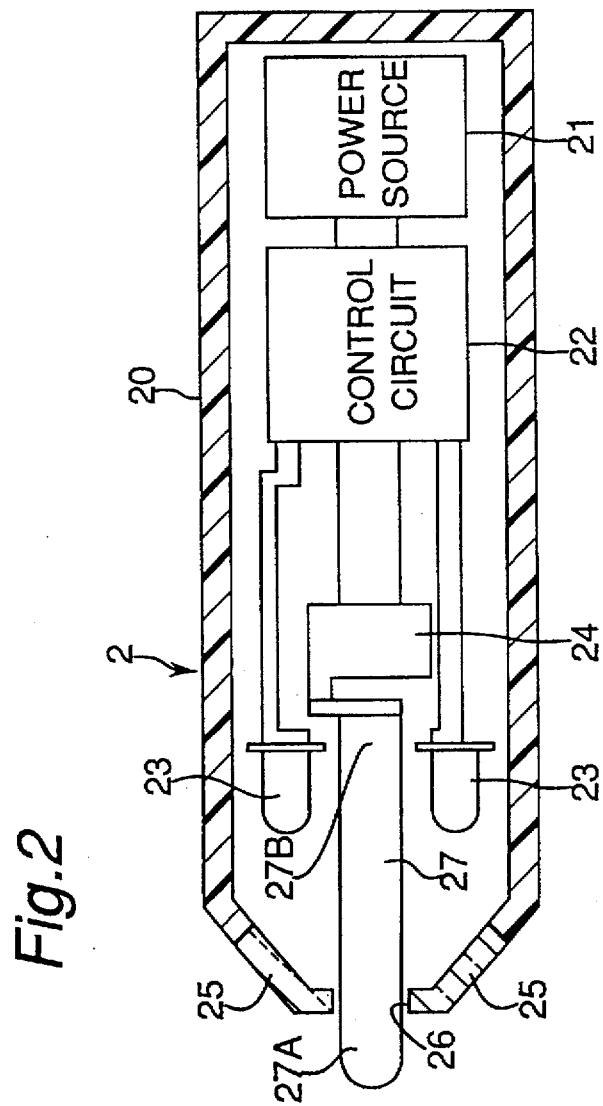
FIG. 2 is a sectional view of a light pen of the first embodiment.

FIG. 2 shows a structure of the light pen 2. The light pen 2 has a cylindrical casing 20 having a tapered tip end, a power source 21, a control circuit 22, a light emitting element 23, and a micro switch 24 which are provided inside the casing 20. The control circuit 22 supplies an electric power to the light emitting element 23 according to an operation of the micro switch 24 so as to make the light emitting element 23 emit light. The casing 20 is made of a synthetic resin in the present embodiment. The tip end portion of the casing 20 is comprised of a transparent output window 25. The output window 25 has an opening 26. Through the opening 26 is penetrating a rod-shaped contactor 27. One end 27A of the contactor 27 is protruding outward through the opening 26, while the other end 27B of the contactor is interlocked with the micro switch 24.

The light emitting element 23 is implemented by an LED or a semiconductor laser device. In the present embodiment, a light emitting element 23 which emits light having a relatively long wavelength is employed, so that the light from the light pen 2 can be easily viewed from a presenter and audience who are listening to the presenter. It is to be noted that the light emitting element 23 may be implemented by an element which emits an infra-red light.

When the contactor 27 is put in contact with the projection screen 3, the micro switch 24 operates, with which operation the control circuit 22 makes the light emitting element 23 emit light. Light emitted from the light emitting element 23 passes through the output window 25 to go outward.

In a case where the control circuit 22 makes the light emitting element 23 flash in a specified cycle, when the presenter smokes near the projection screen 3, the projector main unit 1 can discriminate between the light of the cigarette or cigar and the light from the light pen 2. Therefore, the projector main unit 1 can be prevented from erroneously detecting the light of the cigarette or cigar as the light from the light pen. It is to be noted that the flashing cycle of the light emitting element 23 is preferably set shorter than the read frame cycle of the CCD 8.

In using the pen input function-integrated projection display apparatus having the above-mentioned construction, the projector main unit 1 and the projection screen 3 are installed in a conference room or the like. The projection screen 3 is normally implemented by a cloth, a white board, or the like. However, when the projection screen 3 can not be prepared, a wall may substitute.

Then, the focal position of the light projecting and receiving combinational lens 7 is adjusted so that a display image formed by the LCD panel 19 is focused on the projection screen 3.

With the above-mentioned setting completed, the presenter holds the light pen 2, puts the light pen 2 close to the projection screen 3, puts the light pen 2 in contact with the projection screen 3, and operates the light pen 2 with the light emitting element 23 lit on the display image projected on the projection screen 3. Then, both the light of the display image on the projection screen 3 and the light of the luminescent spot image of the light pen 2 travel toward the light projecting and receiving combinational lens 7. When the projection screen 3 is made of a cloth or the like and the light pen 2 is operated on the rear surface of the screen opposite from the projector main unit 1, a red light transmitted through the projection screen 3 travels toward the light projecting and receiving combinational lens 7 of the projector main unit 1 together with the light of the display image reflected on the projection screen 3.

The light from the projection screen 3 is incident on the combinational lens 7, focused on the LCD panel 19, and then scattered there. More correctly, the light from the projection screen 3 is focused on a surface of the LCD cell 4. Since the polarizing plates 6 and 5 are arranged in the vicinity of the LCD cell 4, there are formed on the polarizing plates 6 and 5 slightly defocus images in comparison with the image focused on the LCD cell 4.

A part of the scattered light from the LCD panel 19 is incident on the detection-use polarizing plate 10 which is arranged opposite to the LCD panel 19 at a specified angle relative to the LCD panel 19. Then, the scattered light which is transmitted through the detection-use polarizing plate 10 is focused on the CCD 8 by the detection lens 9.

The light scattered on the LCD panel 19 includes a light component of the display image which is transmitted through the second polarizing plate 6 of the LCD panel 19 and thereafter projected on the projection screen 3 as well as a light component which is output from the light pen 2 and constitutes the luminescent spot image. The light component of the display image is projected on the projection screen 3 after being transmitted through the second polarizing plate 6 of the LCD panel 19. Therefore, though the direction of polarization slightly deviates on the projection screen 3, a greater part includes the direction of polarization of the second polarizing plate 6. Meanwhile, the light component of the luminescent spot image from the light pen 2 includes various directions of polarization.

Therefore, by setting the direction of polarization of the detection-use polarizing plate 10 in a direction different from the direction of polarization of the second polarizing plate 6, the detection-use polarizing plate 10 scarcely transmits the light of the display image, but it transmits a greater part of the light component of the luminescent spot image.

Particularly when the direction of polarization of the detection-use polarizing plate 10 in a direction perpendicular to the direction of polarization of the second polarizing plate 6, a ratio of the quantity of light of the luminescent spot image with respect to the quantity of light of the display image ((the quantity of light of the luminescent spot image/ (the quantity of light of the display image)) can be maximized. Therefore, an accuracy in detecting the luminescent spot image can be maximized.

Thus the light component of the luminescent spot image and the light component of the display image can be separated from each other. It is possible that a part of the light which is emitted from the projection-use illumination source 11 and then transmitted through the LCD panel 19 travels toward the CCD 8. The above-mentioned light has a light component in the direction of polarization of the second polarizing plate, and therefore most of the light can be interrupted by the detection-use polarizing plate 10. If the CCD 8 is placed in a position out of a range of an angle of visibility of the LCD panel 19, the light travelling from the LCD panel 19 is further weakened, thereby allowing the accuracy in detecting the luminescent spot image to be improved.

The CCD 8 outputs an image signal to the signal processing circuit 16 via the CCD control circuit 15 in response to the light representing the luminescent spot image focused on the CCD 8. The signal processing circuit 16 decides the position of the light pen 2 based on the image signal, and drives the LCD panel drive circuit 14 according to the decided position of the light pen 2. Then, the LCD panel drive circuit 14 drives the LCD panel 19, so that an image illustrated by the light pen 2 on the projection screen 3 is displayed on the LCD panel 19. Then, light of the image displayed on the LCD panel 19 is focused on the projection screen 3 through the combinational lens 7. With the above-mentioned operation, an image is displayed.

According to the present embodiment, both the display image and the luminescent spot image focused on the projection screen 3 by the light incident on the LCD panel 19 from the combinational lens 7 are refocused on the LCD panel 19. Among the images refocused on the LCD panel 19, the luminescent spot image is focused on the CCD 8. Therefore, the luminescent spot image focused on the CCD 8 represents a relative position of the luminescent spot image with respect to the display image. In other words, the luminescent spot image focused on the CCD 8 represents the position of the luminescent spot image relative to the display image on the projection screen 3. Therefore, throughout the light receiving System extending from the light pen 2 via the combinational lens 7 and the LCD panel 19 to the CCD 8, the position of the luminescent spot image relative to the display image is kept unchanged.

Therefore, the luminescent spot image in an input position where an input operation is performed on the projection screen 3 is transmitted sequentially from the combinational lens 7, second polarizing plate 6, CCD 8, control circuit 13, and LCD panel 19, with which the display image focused on the projection screen 3 from the combinational lens 7 can be made to correspond with the luminescent spot image in the input position.

An identical lens 7 concurrently serves as a lens for receiving light from the LCD panel 19 and focusing the light on the projection screen 3 and a lens for receiving reflection light from the projection screen 3 and focusing the light on the second polarizing plate 6. Therefore, the correspondence between the luminescent spot image and the display image in the input position is maintained even when the distance between the main unit 1 and the projection screen 3 changes or when an angle of projection from the main unit 1 relative to the projection screen 3 changes.

As a result, a continuity between the image which has been already input to the projection screen 3 with the light pen 2 and an image to be illustrated with the light pen 2 is assured.

The LCD panel 19 may be also a monochromatic one. However, in a case where color display is performed, it is proper to use a panel provided with filters of two colors or three colors of R (red), G (Green) and B (Blue) per pixel as the LCD panel 19.

Although a single LCD panel is used as the display image forming means in the first embodiment, it is of course acceptable to use a plurality of LCD panels, dichroic mirrors, and total reflection mirrors and perform a high-intensity color display operation in the same manner as in the prior art projection apparatus.

Figure 3:
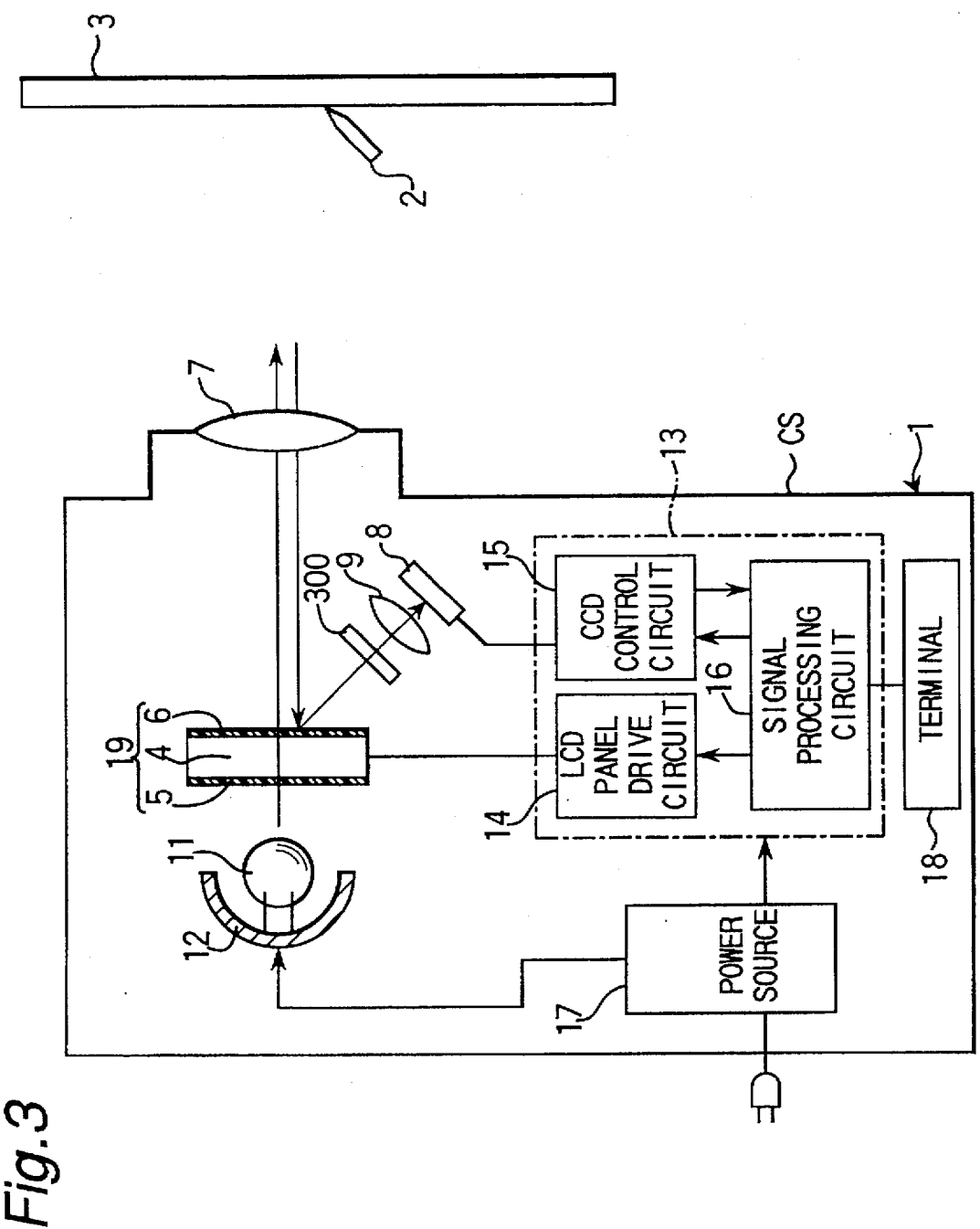
FIG. 3 is a schematic view of a modification of the first embodiment.

Furthermore, the construction of the light pen 2 is not limited to the construction shown in FIG. 2. For instance, by providing a convex lens ahead of the light emitting element 23 and making the focal point of the convex lens coincide with the light emitting point of the light emitting element 23, light emitted from the pen becomes a parallel light. Therefore, the above-mentioned arrangement is advantageous in operating the light pen 2 in a position separated apart in some degree from the projection screen 3. In the present case, it is preferable to separately provide a switch for making the light emitting element 23 emit light on a side surface of the casing 20. When the light emitted from the light pen 2 is infra-red light, an optical filter 300 may be provided as shown in FIG. 3 in place of the detection-use polarizing plate 10. The optical filter 300 transmits infra-red light and reflects or absorb visible light, but it does not transmit the light component of the display image among the components of the illumination light from the illumination source 11 and the reflection light from the projection screen 3. Therefore, the luminescent spot image can be extracted by the optical filter 300 and then guided to the CCD 8. Furthermore, when both the detection-use polarizing plate 10 and the optical filter 300 are provided, the accuracy in detecting the luminescent spot image can be further improved. That is, the detection-use polarizing plate 10 and the optical filter 300 are arranged in a stacked form in the reception light path of the CCD 8. With the above-mentioned arrangement, light in the same direction of polarization as the direction of polarization of the second polarizing plate 6 is interrupted by the detection-use polarizing plate 10 in a manner as described above, and the visible light component of the light leaked from the detection-use polarizing plate 10 can be reflected or absorbed by the optical filter 300. Therefore, light that reaches the CCD 8 is substantially only the infra-red light component constituting the luminescent spot image. Even if the order in position of the detection-use polarizing plate 10 and the optical filter 300 is exchanged, the same effect can be of course produced.

Second embodiment

Figure 4:
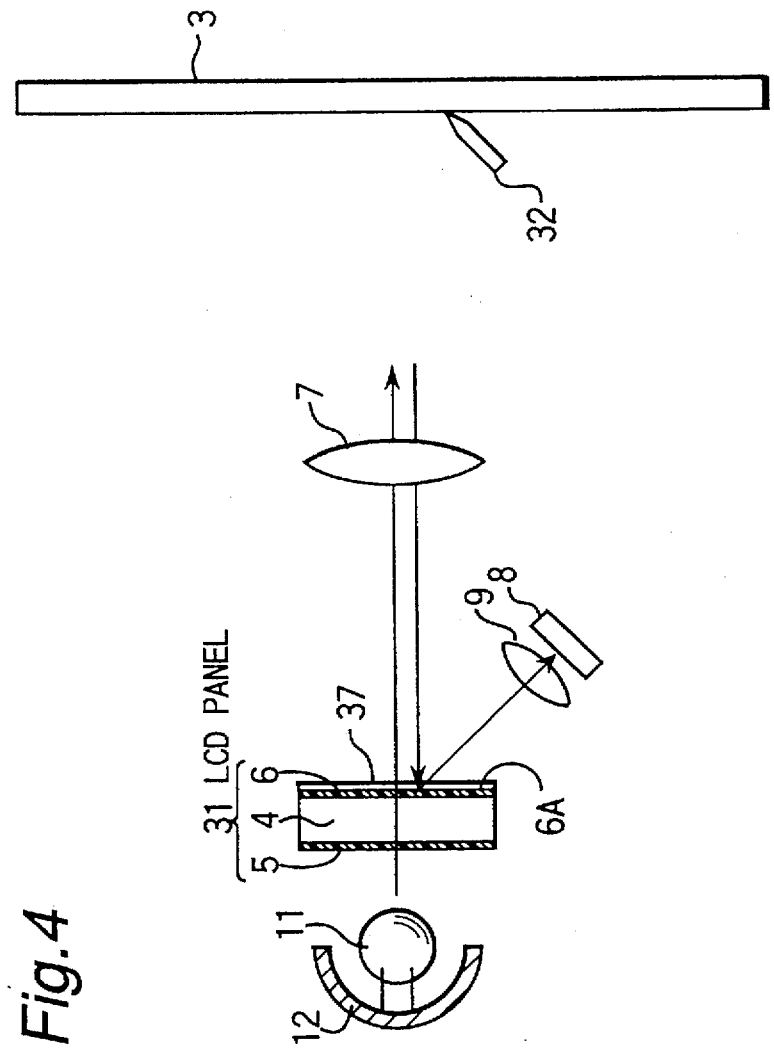
FIG. 4 is a schematic view of an optical system and a projection screen according to a second embodiment of the present invention.

Next, FIG. 4 shows a second embodiment. The second embodiment including a control circuit 13, a power source 17, and a terminal device 18 which are the same as those of the first embodiment. For the sake of simplicity, they are eliminated from FIG. 4. The second embodiment further includes a reflection plate 12 and an illumination source 11 which are the same as those of the first embodiment. On the other hand, the second embodiment includes an LCD panel 31 different from that of the first embodiment. A point of the second embodiment different from the first embodiment will be described in detail below.

The second embodiment is an input function-integrated projection display apparatus. FIG. 4 shows an optical system and a projection screen of the present embodiment. The LCD panel 31 includes an LCD cell 4 interposed between a first polarizing plate 5 and a second polarizing plate 6. The LCD panel 31 further includes an optical filter 37 attached close to a surface 6A of the second polarizing plate 6 facing the combinational lens 7. Therefore, on the optical filter 37 are incident light which is outputted from the illumination source 11 and then transmitted through the LCD panel 31 and light incident on the LCD panel 31 from the combinational lens 7.

Figure 5:
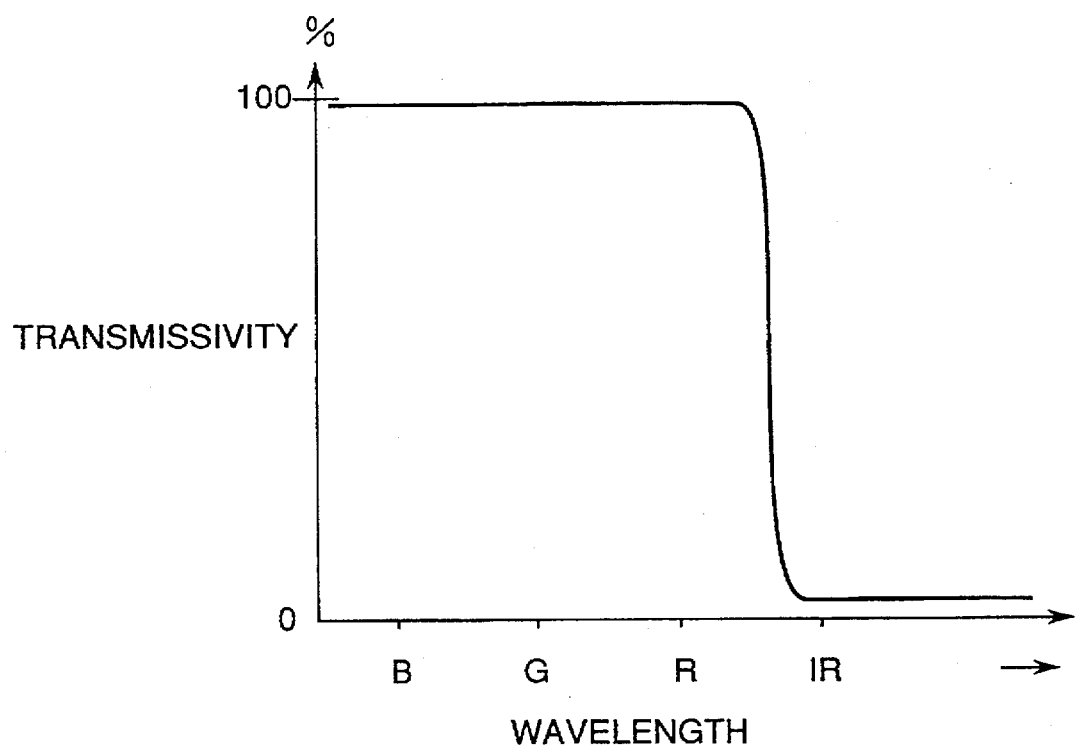
FIG. 5 is a graph showing an optical characteristic of an optical filter constituting the second embodiment.

The optical filter 37 has an optical characteristic as shown in FIG. 5. In detail, the optical filter 37 has a transmissivity of light (for example, blue light B, green light G, and red light R) of approximately 100% in the region of visible light, and a transmissivity of light (IR) of almost 0% in the infra-red region. Therefore, among the light incident on the optical filter 37, the light (IR) in the infra-red region is approximately completely scattered.

Furthermore, the present embodiment comprises a light pen 32. The light pen 32 differs from the light pen 2 of the first embodiment only in that the present light pen has a light emitting element which emits infra-red light. The light emitting element is implemented by an LED or a semiconductor laser device. In the present embodiment, the LED or the semiconductor laser device constituting the light emitting element is limited to a one which emits infra-red light.

In the second embodiment having the above-mentioned construction, light of a display image formed in the LCD panel 31 is transmitted through the optical filter 37 and thereafter enlargedly displayed on the projection screen 3 by a light projecting and receiving combinational lens 7.

Further, the light of the display image on the projection screen 3 and light of a luminescent spot image constituted by the infra-red light impinging on the projection screen 3 from the light pen 32 are transmitted through the combinational lens 7 and then focused on the optical filter 37.

In the LED panel 31, the light of the display image is transmitted through the optical filter 37 approximately as it is, while the light of the luminescent spot image, composed of the infra-red light, is scattered on the optical filter 37. Then, a part of the scattered light is focused on the CCD 8 by the detection lens 9. Therefore, only the luminescent spot image is to be detected by the CCD 8.

In the second embodiment, the light projecting and receiving combinational lens 7 is arranged so that the focal position of the lens 7 coincides with the position of the LCD cell 4 of the LCD panel 31. Therefore, it is preferable to put the optical filter 37 close to the LCD cell 4 as much as possible. Therefore, as described above, an image having the least defocus can be formed on the optical filter 37 when the optical filter 37 is arranged close to the surface 6A of the second polarizing plate 6. Therefore, an image having the least defocus can be formed on the CCD 8.

Furthermore, since the optical filter 37 is integrated with the LCD panel 31 in the present embodiment, there are not only assured easy handling but also required neither means nor process for mounting the optical filter 37 in a specified position, a reduced cost is achieved. Otherwise, the LCD panel 31 may be a color display panel provided with a color filter. Although the LCD panel 31 is adopted as the display image forming means in the present embodiment, there may be adopted, for example, an EL (electro luminescence) panel, a PD (plasma display) panel, a high luminance CRT or the like as display image forming means. Although the LCD panel 31 is a transmission type in the present embodiment, it is acceptable to adopt a reflection type LCD, an SLM (Spatial Light Modulator), a DMD (Deformable Mirror Device) or the like.

Third embodiment

Figure 6:
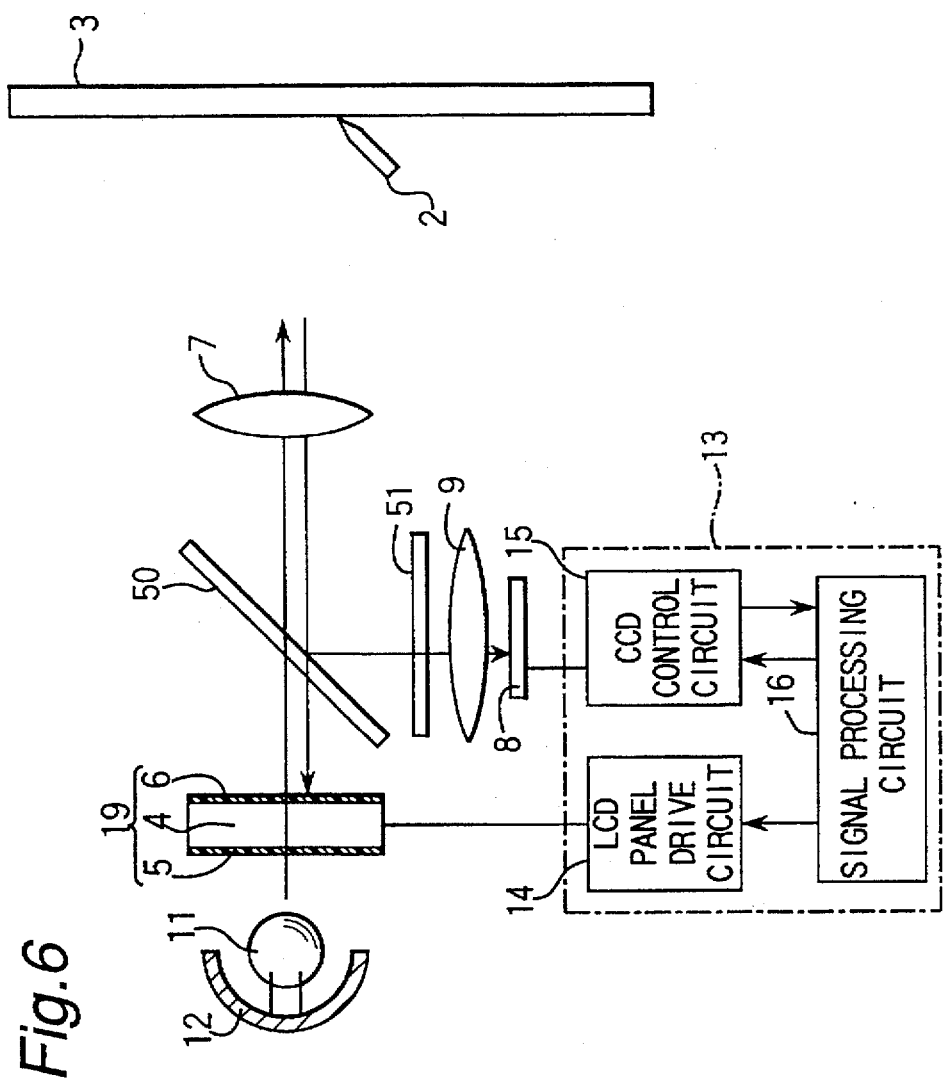
FIG. 6 is a schematic view of an optical system, a control circuit section, and a projection screen of an input function-integrated projection display apparatus according to a third embodiment of the present invention.

Next, FIG. 6 shows a third embodiment. The third embodiment is an input function-integrated projection display apparatus. The present embodiment is the same as the first embodiment in regard to the point that it includes a control circuit 13, a reflection plate 12, an illumination source 11, a power source 17 and a terminal device 18 which are the same as those of the first embodiment. For the sake of simplicity, the power source 17 and the terminal device 18 are eliminated from FIG. 6. Furthermore, the third embodiment is the same as the first embodiment in regard to the point that it includes an LCD panel 19, a combinational lens 7, a projection screen 3 and a light pen 2 which are the same as those of the first embodiment. However, the third embodiment differs from the first embodiment in that it does not have the detection-use polarizing plate 10 which is employed by the first embodiment, and includes a half mirror 50 and a scatterplate 51 which are not employed by the first embodiment. A point of the third embodiment different from the first embodiment will be described in detail below.

The half mirror 50 is arranged between the LCD panel 19 and the combinational lens 7 as inclined counterclockwise at an angle of approximately 45° relative to an optical path between the LCD panel 19 and the combinational lens 7. In other words, the half mirror 50 is inclined by approximately 45° relative to the combinational lens 7 as it is intersecting the optical axis of the combinational lens 7. In the transmission optical path of the half mirror 50 are arranged in order the LCD panel 19 and the illumination source 11. Since the half mirror 50 has a small reflectance of about 2%, it transmits almost all lights. On the other hand, in the reflection optical path of the half mirror 50 are arranged in order the scatterplate 51 which is light scattering means, the detection lens 9 and the CCD 8. The scatterplate 51 is arranged so that an optical path length from the scatterplate 51 to the combinational lens 7 is equal to an optical path length from the LCD panel 19 to the combinational lens 7.

The light pen 2 is the same as that of the first embodiment, while the light emitting element 23 emits light having a relatively long wavelength such that the light can be easily viewed from both the explainer and the audience. The light emitting element 23 is implemented by an LED or a semiconductor laser device.

Furthermore, in the present embodiment, the scatterplate 51 is implemented by a frosted glass-like scattering plate 51 for transmitting red light. Then the scatterplate 51 is placed in a position where the focal length of the combinational lens 7 and the focal length of the detection lens 9 coincide with each other. Therefore, an image on the projection screen 3 is focused on the scatterplate 51 by the combinational lens 7. Further, the image focused on the scatterplate 51 is focused on the CCD 8 by the detection lens 9.

The detection lens 9 is a convex lens. With the existence of the detection lens 9, the focal length of the light receiving system can be reduced more than in a case where the detection lens 9 is not existing. Since the image on the projection screen 3 is focused through reduction on the CCD 8, the light receiving surface of the CCD 8 can be made smaller than the light receiving surface of the LCD panel 19. Therefore, a cost reduction can be achieved. It is advantageous for the detection lens 9 to have a greater aperture in terms of collecting light from the projection screen 3 as much as possible. However, there is a disadvantage that a greater aberration results when the aperture is increased. It is to be noted that the detection lens 9 can be eliminated if the focal length of the light receiving system is not required to be reduced.

A signal processing circuit 16 of the present embodiment perceives the display image displayed in the LCD panel 19, and takes in a reception image received by the CCD 8 via a CCD control circuit 15. Then, the signal processing circuit 16 compares the display image with the reception image. When a varied portion exists between the display image and the reception image, the varied portion is recognized as the luminescent spot image provided by the light pen 2. That is, the signal processing circuit 16 detects the position of the light pen 2 by executing a logical signal processing operation of taking EXOR (exclusive OR) between the display image and the reception image.

Providing such a frosted glass-like scatterplate 51 as in the present embodiment is advantageous in terms of cost, however, there is a drawback that a reduced light use efficiency results.

Therefore, by providing a Fresnel lens in place of the scatterplate 51, the light use efficiency can be improved.

When the distance between the Fresnel lens and the detection lens 9 is made to coincide with the focal length of the Fresnel lens, an image focused on the Fresnel lens is converged on the detection lens 9. Therefore, the light use efficiency can be improved.

It is noted that the scatterplate 51 and the Fresnel lens can be eliminated though the light use efficiency of the light receiving system reduces.

Although the LCD panel 19 is monochromatic in the above description, the LCD panel 19 may be provided with a color filter to perform a color image display.

Although the LCD panel 19 is used as the display image forming means in the present embodiment, the present invention is not limited to this. For instance, an EL (electro luminescence) panel, a PD (plasma display) panel, a high luminance CRT or the like may be used.

Although the LCD panel 19 is a transmission type in the present embodiment, it is acceptable to use a reflection type LCD, an SLM (Spatial Light Modulator), a DMD (Deformable Mirror Device) or the like.

Fourth embodiment

Figure 7:
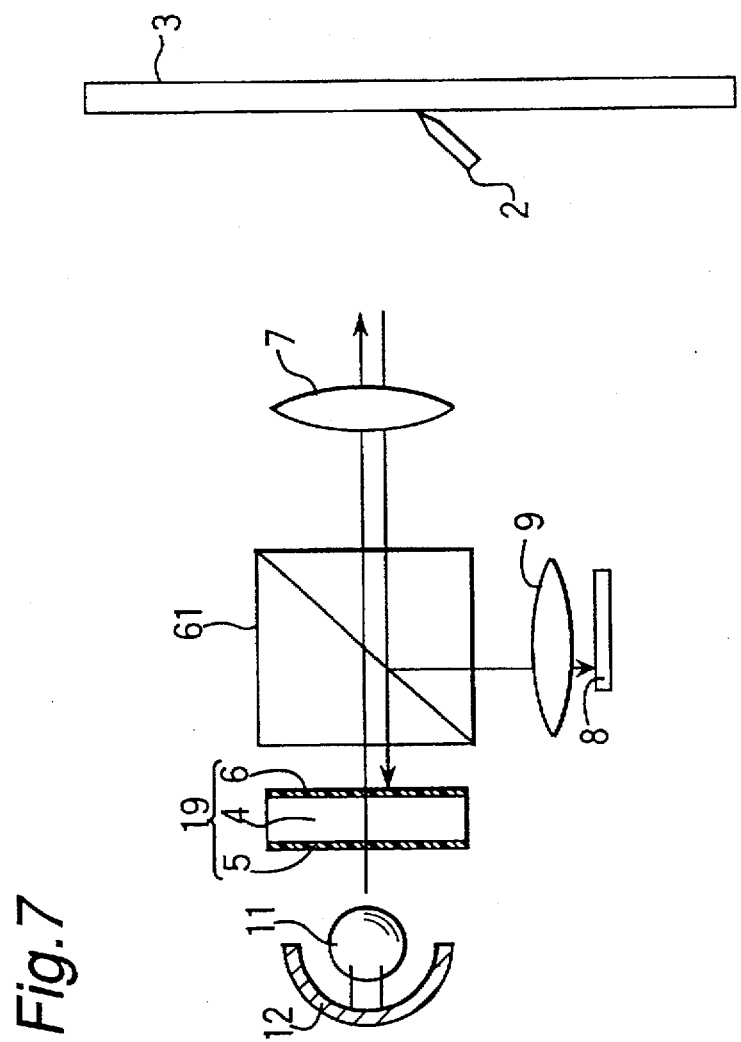
FIG. 7 is a schematic view of an optical system and a projection screen of an input function-integrated projection display apparatus according to a fourth embodiment of the present invention.

Next, FIG. 7 shows a fourth embodiment. The fourth embodiment is an input function-integrated projection display apparatus. The present embodiment is the same as the first embodiment in regard to the point that it includes a control circuit 13, a reflection plate 12, an illumination source 11, a power source 17 and a terminal device 18 which are the same as those of the first embodiment. It is to be noted that the control circuit 13, the power source 17 and the terminal device 18 are eliminated from FIG. 7. Furthermore, the fourth embodiment includes an LCD panel 19, a combinational lens 7, a projection screen 3 and a light pen 2 which are the same as those of the first embodiment. However, the fourth embodiment does not have the detection-use polarizing plate 10 which is employed by the first embodiment, but includes a polarizing beam splitter 61 which is not employed by the first embodiment. Therefore, a point of the fourth embodiment different from the first embodiment will be described.

The polarizing beam splitter 61 is arranged between the LCD panel 19 and the combinational lens 7. The polarizing beam splitter 61 transmits light having a direction of polarization of a second polarizing plate 6 owned by the LCD panel 19. That is, the polarizing beam splitter 61 transmits the light component in the direction of polarization of the second polarizing plate 6, and reflects a polarized light component in a direction perpendicular to the direction of polarization of the second polarizing plate.

An optical path in the direction of reflection of the polarizing beam splitter 61 is approximately perpendicular to the optical path between the LCD panel 19 and the combinational lens 7. On the optical path in the direction of reflection are arranged in order the detection lens 9 and the CCD 8.

Furthermore, the light pen 2 has the same structure as that of the first embodiment shown in FIG. 2. However, particularly in the present embodiment, a light emitting element 23 of the light pen 2 is implemented by an LED or a semiconductor laser device, and operates to form luminescent spot image by throwing light from the light emitting element 23 toward the projection screen 3. Therefore, a luminescent spot image having a high resolution can be obtained.

In the present embodiment, a transmission light from the LCD panel 19 is transmitted through the polarizing beam splitter 61. A direction of polarization of the transmission light is aligned in the direction of polarization of the second polarizing plate 6 of the LCD panel 19. The transmission light is refracted in the combinational lens 7 and then thrown toward the projection screen 3 to form an enlarged display image. Then, a greater part of the reflection light from the display image on the projection screen 3 still has approximately the same direction of polarization as that of the transmission light from the LCD panel 19, though a light having a direction different from that of the transmission light takes place in the time of reflection. Therefore, most of the reflection light from the display image on the projection screen 3 can be transmitted through the polarizing beam splitter 61 after being refracted in the combinational lens 7, and then refocused on the LCD panel 19.

Meanwhile, the luminescent spot image formed by the light emitted from the light pen 2 includes light components in various directions of polarization. Therefore, when the light from the luminescent spot image is transmitted through the combinational lens 7 and made incident on the polarizing beam splitter 61, the polarizing beam splitter 61 reflects many light components of the light from the luminescent spot image, and makes them travel toward the CCD 8.

Thus, in the present embodiment, the light from the projection screen 3 can be separated into a light component constituting the display image and a light component constituting the luminescent spot image by means of the polarizing beam splitter 61. Consequently, substantially only the luminescent spot image is received by the CCD 8, thereby allowing the position of the light pen 2 relative to the display image to be detected.

In the present embodiment, in regard to the projection of the display image on the projection screen 3, the polarizing beam splitter 61 has the same function as that of the second polarizing plate 6 of the LCD panel 19. That is, both the polarizing beam splitter 61 and the second polarizing plate 6 transmit only the light component having the same direction of polarization as the direction of polarization of the second polarizing plate 6 among the light components transmitted through the LCD cell 4. Therefore, in regard to the projection of the display image on the projection screen 3, either one of the second polarizing plate 6 and the polarizing beam splitter 61 can singly play the role. On the other hand, in regard to the detection of the luminescent spot image, the polarizing beam splitter 61 is surely necessary as described above. As a conclusion, if the second polarizing plate 6 is eliminated from the present embodiment, no influence is exerted on the display image and the luminescent spot image. Therefore, if the second polarizing plate 6 is eliminated, there can be achieved a cost reduction by the elimination of the material cost, a bonding process therefor and so forth.

In the above-mentioned embodiment, if the direction of polarization of the light emitted from the light pen 2, in particular, the direction of polarization of the laser light is set in a random direction, a greater part of the light components of the light from the luminescent spot image can be reflected by the polarizing beam splitter 61. Therefore, the luminescent spot image formed by the light pen 2 can be detected with high accuracy.

Furthermore, by providing the light from the light emitting element 23 of the light pen 2 by a circularly polarized light, there can be surely provided a light component to be reflected by the polarizing beam splitter 61, thereby allowing the detection accuracy to be further improved.

Although the detection lens 9 is provided to reduce the focal length of the light receiving system in the present embodiment, the detection lens 9 may be eliminated if the focal length of the light receiving system is not required to be reduced.

Fifth embodiment

Figure 8:
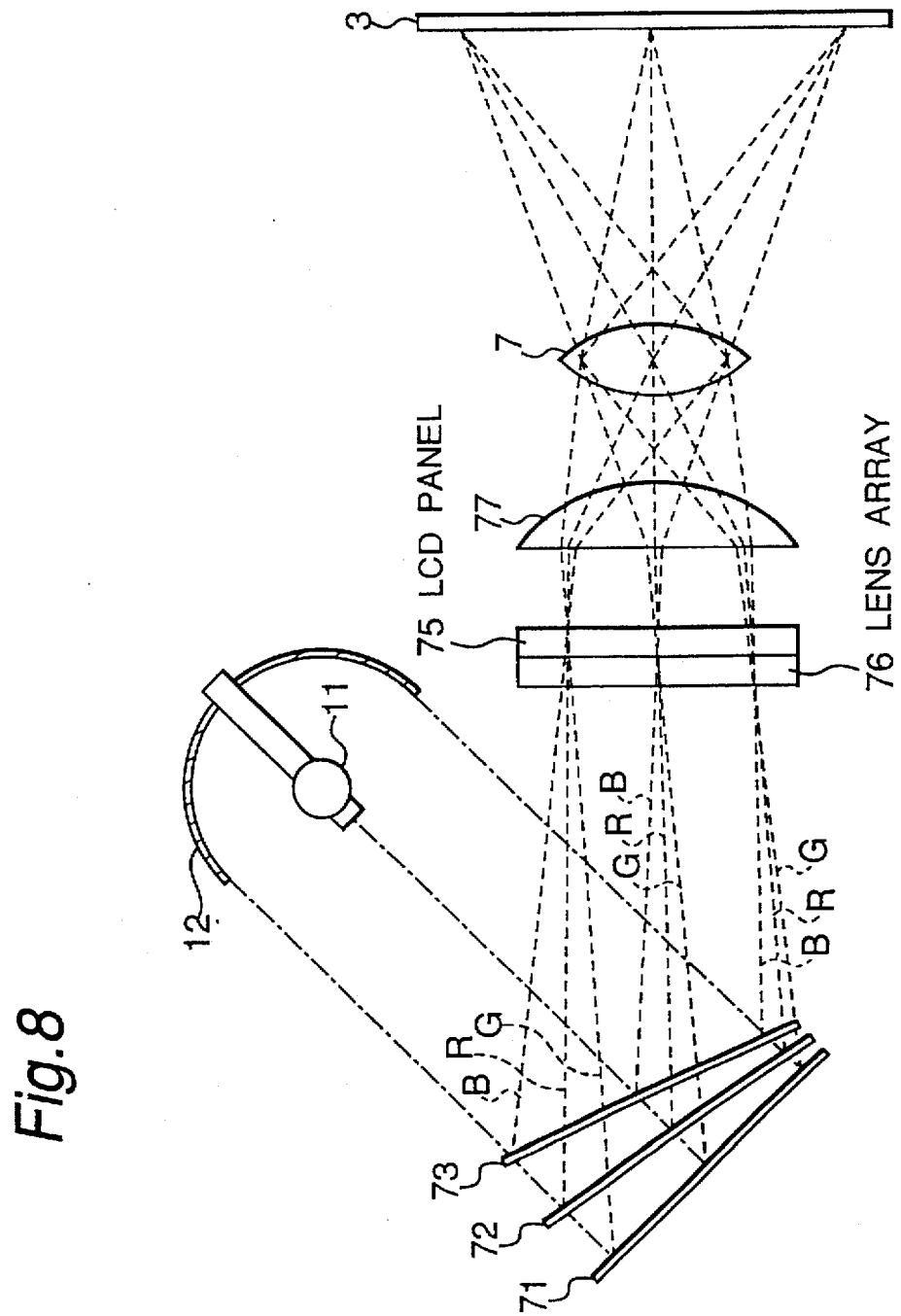
FIG. 8 is a schematic sectional view of an optical system of a projection display apparatus according to a fifth embodiment of the present invention.

Next FIG. 8 shows an optical system of a fifth embodiment. The fifth embodiment is an input function-integrated projection display apparatus. The present embodiment is the same as the first embodiment in regard to the point that it includes a control circuit 13, a reflection plate 12 and an illumination source 11 which are the same as those of the first embodiment. Furthermore, the fifth embodiment is the same as the first embodiment in regard to the point that it includes a combinational lens 7, a projection screen 3 and a light pen 2 which are the same as those of the first embodiment. However, the fifth embodiment differs from the first embodiment in that it includes dichroic mirrors 71, 72 and 73 for reflecting light from the illumination source 11 toward an LCD cell of an LCD panel 75. Furthermore, the fifth embodiment differs from the first embodiment in that a lens array 76 is attached to the LCD panel 75. A point of the fifth embodiment different from the first embodiment will be described in detail below.

In the first through fourth embodiments, the LCD panel is required to be provided with a color filter when a color display is performed by one LCD panel. Otherwise, in the first through fourth embodiments, a high-intensity color display is required to be performed by means of a plurality of LCD panels, dichroic mirrors, and total reflection mirrors. When one LCD panel and a color filter is used, a low-cost projection display apparatus can be constructed. However, a color filter is used in order to take light of a color corresponding to each pixel out of the illumination source, there is a disadvantage that the screen becomes dark. For instance, when a white light from the illumination source is put through an R (red) color filter, a G (green) color filter and a B (blue) color filter, the intensity of the light is theoretically reduced to one third. When a plurality of LCD panels and dichroic mirrors are combined, for example, the white light is once separated into R (red), G (green) and B (blue) color components, and after being transmitted through LCD panels of respective colors, the color components are recombined. Therefore, a small loss of light results. However, in the present case, since the plural number of LCD panels, dichroic mirrors, and total reflection mirrors are necessitated, there are the results of a cost increase and a disadvantage that compacting of the apparatus can be hardly achieved.

In contrast to the above, the fifth embodiment can concurrently achieve both a bright color display screen and a low cost. The fifth embodiment comprises the illumination source 11, plural number of dichroic mirrors 71, 72 and 73, and one LCD panel 75. Furthermore, as shown in FIG. 8, the lens array 76 is attached to the LCD panel 75. Furthermore, a Fresnel lens 77 is arranged between the LCD panel 75 and the combinational lens 7.

As shown in FIG. 8, the dichroic mirror 72 is inclined clockwise at a specified angle relative to the dichroic mirror 71, while the dichroic mirror 73 is inclined clockwise at a specified angle relative to the dichroic mirror 72. The dichroic mirror 71 selectively reflects the green light G out of the white light from the illumination source 11. The dichroic mirror 72 selectively reflects the red light R out of the white light from the illumination source 11. The dichroic mirror 73 selectively reflects the blue light B out of the white light from the illumination source 11.

Therefore, the dichroic mirrors 71, 72 and 73 separate the white light from the illumination source into three colors of green, red and blue, and make the three colors incident on the LCD panel 75 at different incident angles.

Figure 9:
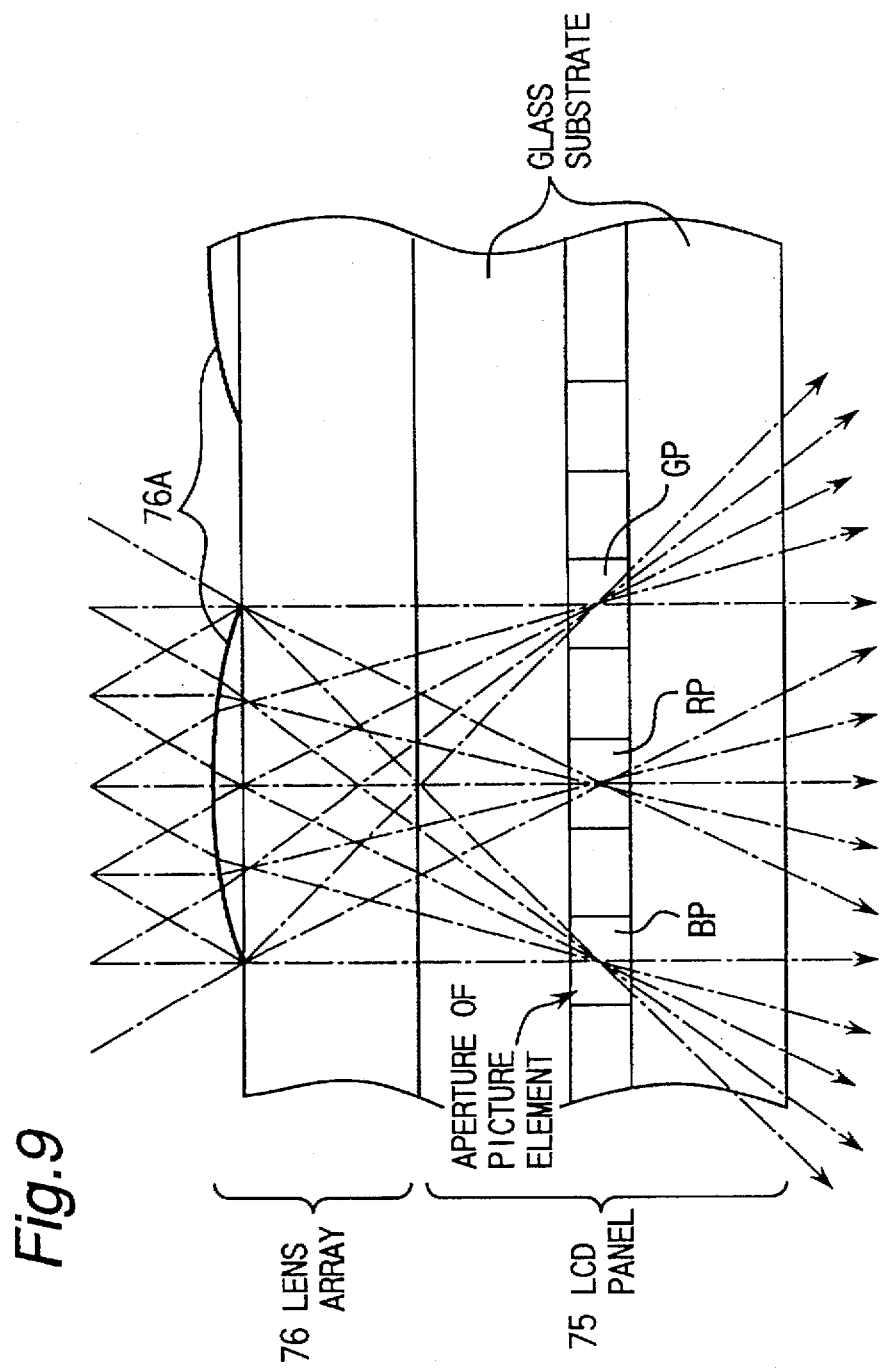
FIG. 9 is an enlarged view of a section of an LCD panel constituting the fifth embodiment.

As shown in FIG. 9, the lens array 76 having a plurality of microscopic convex lenses 76A is bonded to a surface 75A of the LCD panel 75. The surface 75A is a surface of a glass substrate. The above-mentioned three incident lights are refracted by one microscopic convex lens 76A of the lens array 76 to be made incident on three pixels GP, RP and BP of the LCD panel 75. The three incident lights which are incident at different angles are focused on the three pixels GP, RP and BP corresponding to the G (green), R (red) and B (blue), respectively.

With the above-mentioned operation, the red light R is incident on the pixel RP corresponding to the red color, while the green light G is incident on the pixel GP corresponding to the green color. Meanwhile, the blue light B is incident on the pixel BP corresponding to the blue color.

Then, in a manner as shown in FIG. 9, the three colors transmitted through the LCD panel 75 diffuse as they are separating apart from the LCD panel 75 due to the difference between the incident angles thereof. However, in a manner as shown in FIG. 8, the diffusion of the three colors can be suppressed by the Fresnel lens 77. Then, the light transmitted through the Fresnel lens 77 is refracted in the combinational lens 7 to form an enlarged image as focused on the projection screen 3.

According to the fifth embodiment, a low-cost high-intensity color display can be performed by the one LCD panel 75 and the three dichroic mirrors. In other words, according to the fifth embodiment, an easy-to-see color image can be obtained at a low cost. In the fifth embodiment, a method for separating the light component of a display image returning from the projection screen and the light component which is output from the light pen and constitutes the luminescent spot image can be implemented by any of the methods of the first through fourth embodiments.

Although the fifth embodiment has been described based on the LCD panel 75 selected as the display image forming means, the present invention is not limited to this, and it is a matter of course that the means is only required to be a transmission type display apparatus. Although the fifth embodiment is provided with the Fresnel lens 77, the Fresnel lens 77 can be eliminated if a slight reduction of an ability of converging the display light is permitted.

Sixth embodiment

Figure 10A:
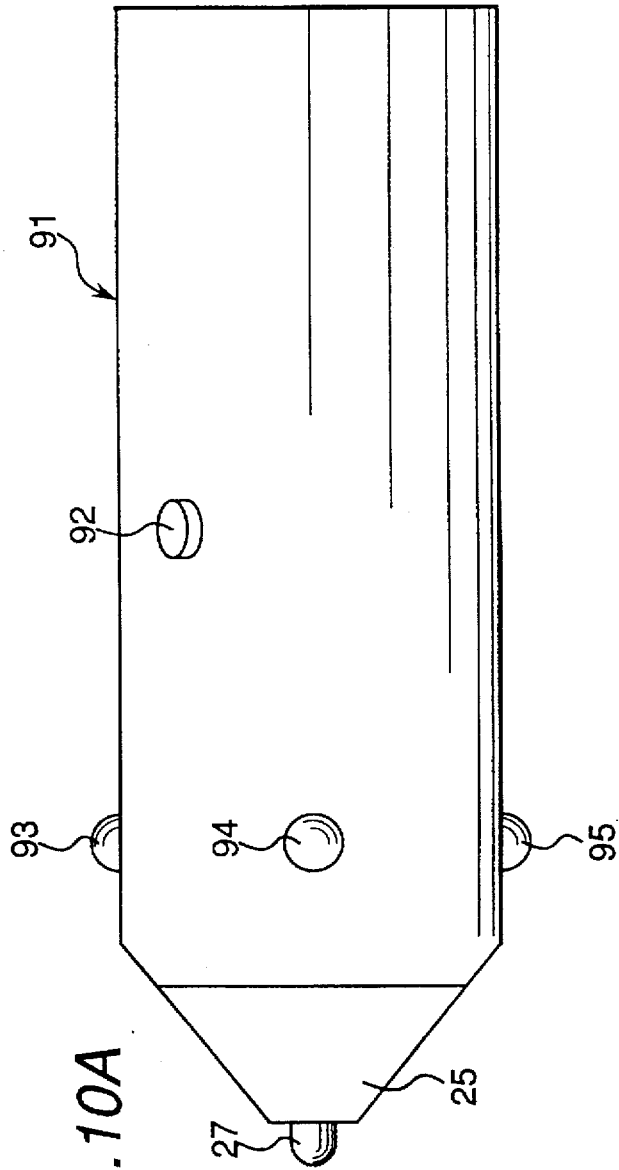
FIG. 10A is an external view of a light pen of an input function-integrated projection display apparatus according to a sixth embodiment of the present invention.

Next, FIG. 10A shows an external view of a light pen of a sixth embodiment. Since the structure of the light pen of the sixth embodiment is different from that of the first embodiment, the light pen will be described in detail below.

A light pen 91 of the present embodiment includes a micro switch 92 provided on a peripheral side surface, an LED 93 which emits a red light, an LED 94 which emits a green light and an LED 95 which emits a blue light. The micro switch 92 and the LEDs 93, 94 and 95 are connected to an internal control circuit in a manner similar to the light pen of the first embodiment shown in FIG. 2. The micro switch 92 is to selectively light the three color LEDs provided on the side surface. For instance, when the micro switch 92 is depressed once in a state in which only the red LED 93 is lit, the red LED 93 is unlit, and only the green LED 94 is lit. When the micro switch 92 is depressed once while only the green LED 94 is lit, the green LED 94 is unlit, and only the blue LED 95 is lit. When the micro switch 92 is depressed once while only the blue LED 95 is lit, all the three LEDs are unlit. Thus every time the micro switch 92 is depressed once, any of the four states of the state in which the R (red) LED is lit, the state in which the G (green) LED is lit, the state in which the B (blue) LED is lit and the state in which all the LEDs are unlit changes to the subsequent state.

The light pen 91 includes an internal light emitting element 23 similar to the first embodiment shown in FIG. 2 independently of the above-mentioned three LEDs. The internal light emitting element is implemented by an LED or a semiconductor laser device which emits infra-red light so as to distinguish the element from the three LEDs provided on the side surface.

Figure 10B:
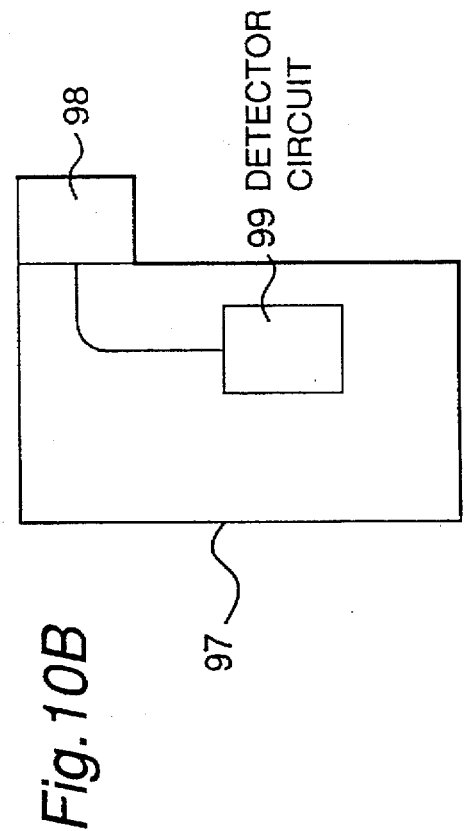
FIG. 10B is a schematic view of a main unit of the sixth embodiment.

On the other hand, the sixth embodiment includes a main unit 97 achieved by providing the main unit 1 of the first embodiment with a light receiving element 98 capable of detecting light from the three LEDs provided on the side surface of the light pen 91. The light receiving element 98 is implemented by, for example, a CCD. The same components as those of the main unit of the first embodiment are not shown in FIG. 10B.

An operator of the sixth embodiment having the above-mentioned construction firstly lights one having the desired color of the three LEDs 93 through 95 by depressing several times the micro switch 92 provided on the side surface of the light pen 91. When the light pen 91 is put between the main unit 97 and the projection screen 3, the light receiving element 98 provided at the main unit 97 receives the light from one of the LEDs provided on the side surface of the light pen 91. Since the light receiving element 98 is connected to a detector circuit 99, it is detected by the detector circuit 99 which of the three LEDs provided on the side surface is currently lit upon receiving a signal from the light receiving element 98. The detector circuit 99 transmits a result of the detection to the signal processing circuit 16, and drives the LCD panel drive circuit 14 so that the same color as detected is displayed on a luminescent spot image detection position.

Thus, according to the present embodiment, the operator of the light pen 91 can write a trace of the light pen 91 operated on the projection screen 3 in the desired color, thereby allowing the operator to effectively perform partial emphasis and explanation in a presentation.

Although the LEDs of three colors are provided on the side surface of the light pen 91 in the above description, the present invention is not limited to this, and it is of course acceptable to provide light emitting elements of arbitrary colors. Furthermore, it is also acceptable to allow several sorts of different color signals emitted from one light emitting element to be detected at the main unit 97 by varying the lighting frequency of the light emitting element provided on the side surface of the light pen 91. The emission light color of each light emitting element provided on the side surface of the light pen 91 is not always required to coincide with the display image color of the trace of the light pen 91 to be displayed on the projection screen 3 based on the emission of light from the light emitting element. In other words, it is of course acceptable to make the emission light color of each light emitting element provided on the side surface of the light pen 91 correspond to an arbitrary display image color.

Furthermore, it is acceptable to not only change the display image color on the projection screen 3 according to the signal from each light emitting element provided on the side surface of the light pen 91 but also perform an image processing operation such as scrolling or erasing of the display image displayed on the projection screen according to a signal from each light emitting element provided on the side surface of the light pen.

Seventh embodiment

Next, a seventh embodiment will be described. The seventh embodiment is a modification of the sixth embodiment. The seventh embodiment is so constructed that, when a micro switch 92 of a light pen 91 as shown in FIG. 10A of the sixth embodiment is depressed, an emission light from an internal light emitting element 23 in the light pen 91 flashes. Then, the frequency of flashing of the emission light is detected by a CCD 8 and a CCD control circuit 15 included in a main unit 97. Then, a detection signal at the frequency of flashing is output from the CCD control circuit 15 to a signal processing circuit 16. With the above-mentioned operation, the signal processing circuit 16 controls an LCD panel drive circuit 14 to make it drive the LCD panel 19 so as to perform a variety of processing operations such as scrolling or erasing of the display image on the screen. Since the operation of the display image on the screen can be easily performed in a manner as described above, a presentation can be performed smoothly and effectively.

It is to be noted that the micro switch 92 is not required to be one in number, and it is acceptable to provide a plurality of micro switches and make light emitting elements 23 flash at a varied frequency when a varied micro switch is depressed. Then, the control circuit 13 may be so constructed that an image processing operation corresponding to the frequency of flashing of the light emitting element 23 is performed.

Eighth embodiment

Figure 11C:
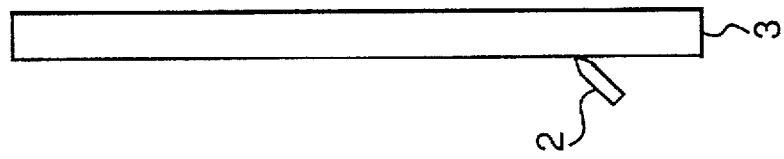
FIGS. 11A, 11B and 11C are views of an illumination source, display image forming means and a projection screen of a projection display apparatus according to an eighth embodiment of the present invention.
Figure 11B:
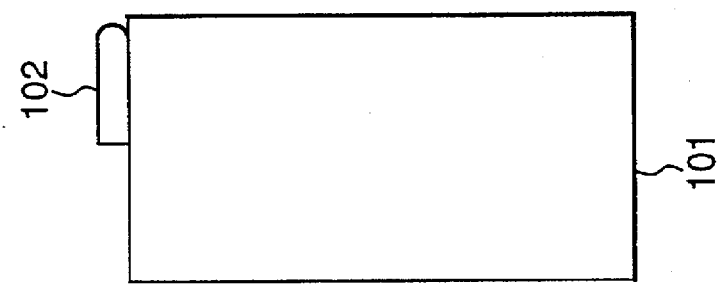
Figure 11A:
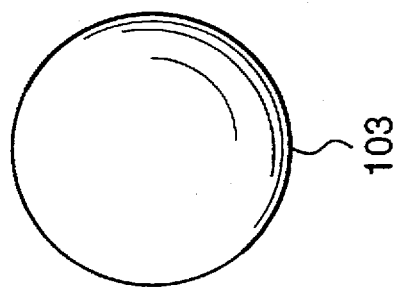
Figure 12:
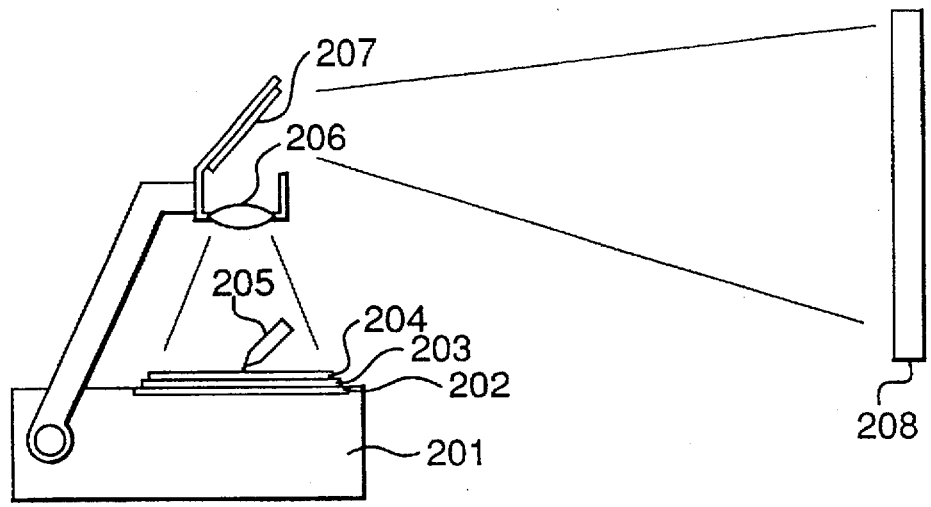
FIG. 12 is a view of a projection display apparatus of a first prior art.
Figure 13:
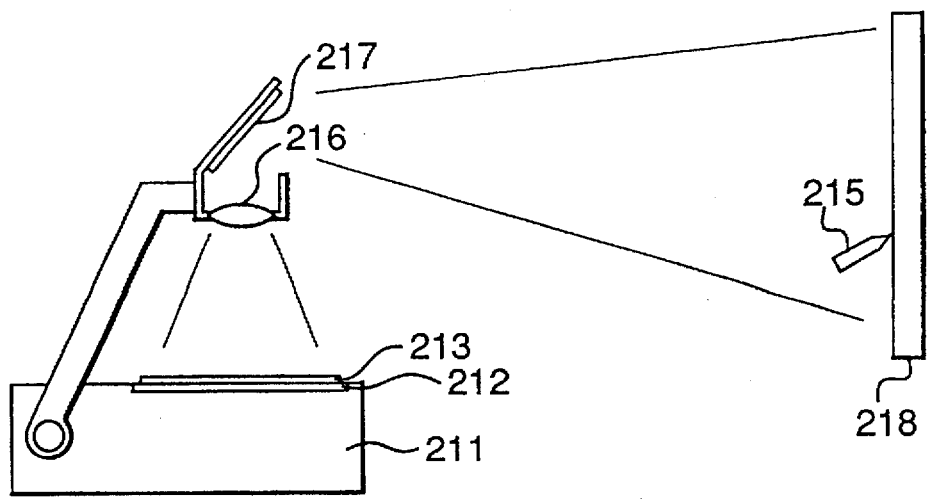
FIG. 13 is a view of a projection display apparatus of a second prior art.
Figure 14:
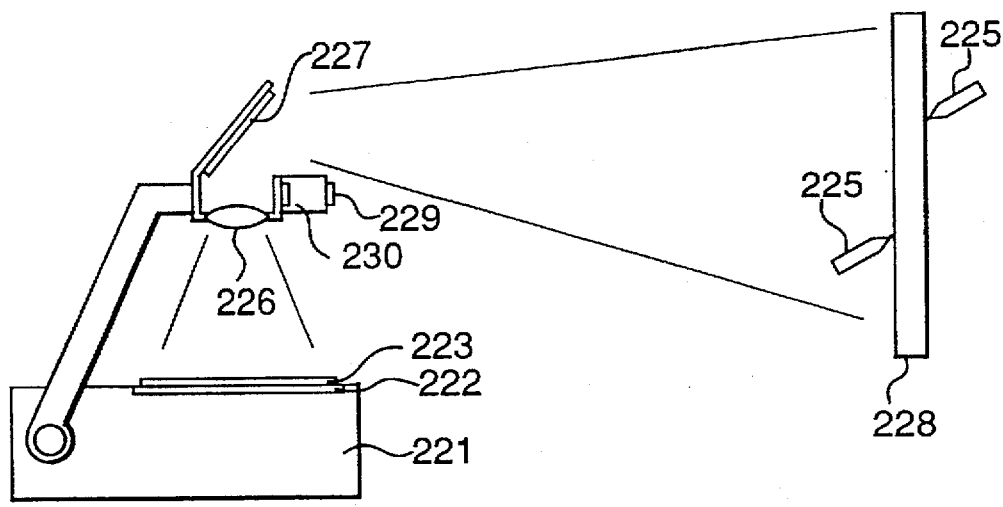
FIG. 14 is a view of a projection display apparatus of a third prior art.
Figure 15:
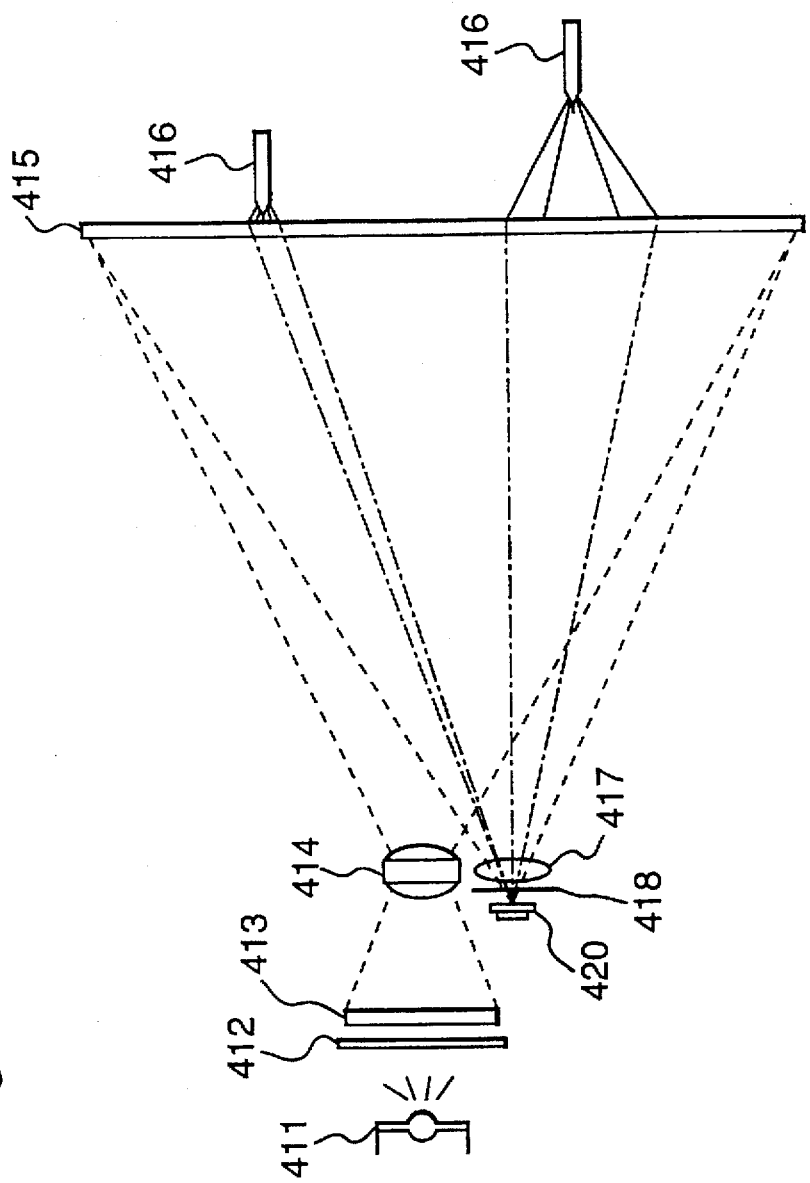
FIG. 15 is a view of a projection display apparatus of a fourth prior art.
Figure 16:
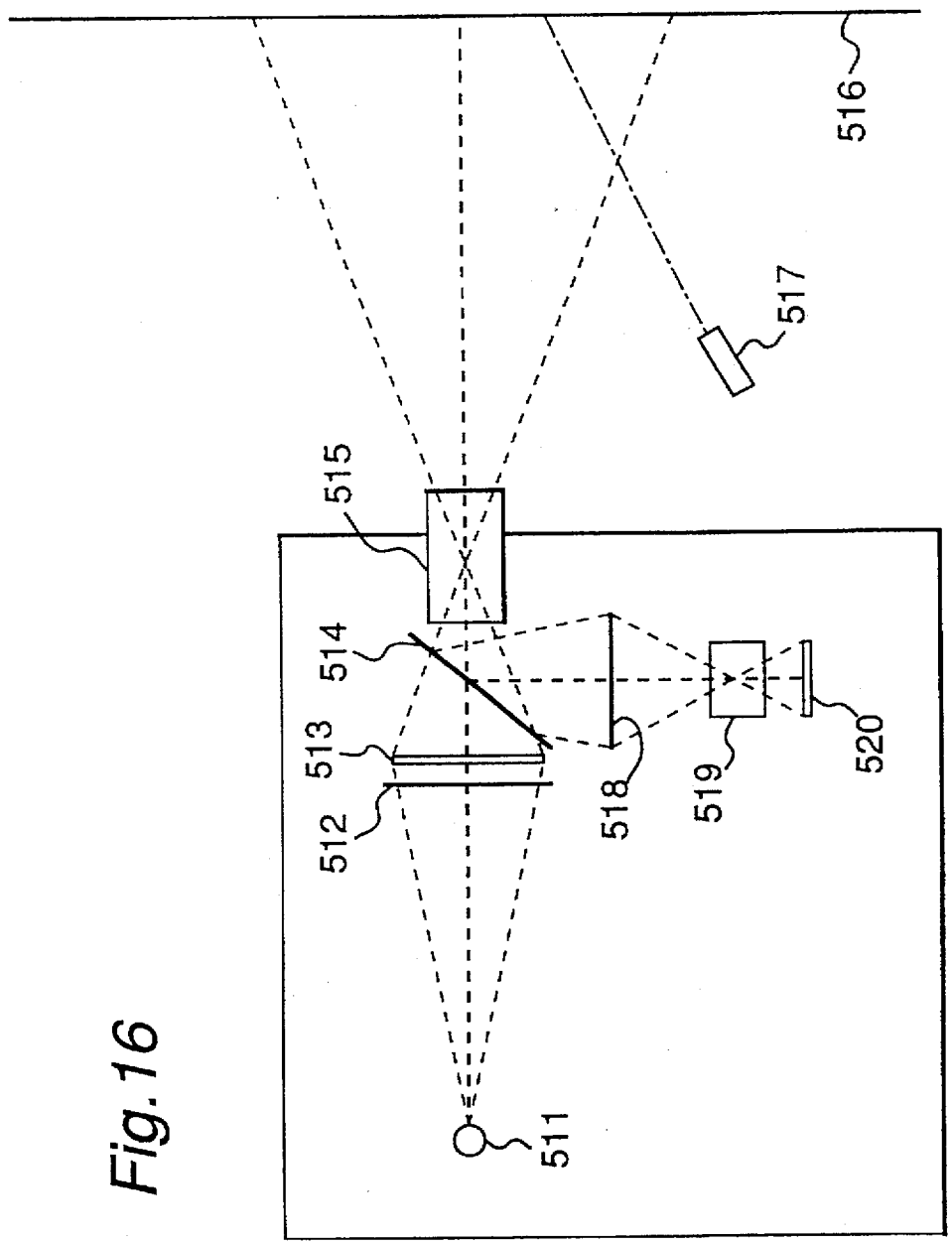
FIG. 16 is a view of a projection display apparatus of a fifth prior art.
Figure 17:
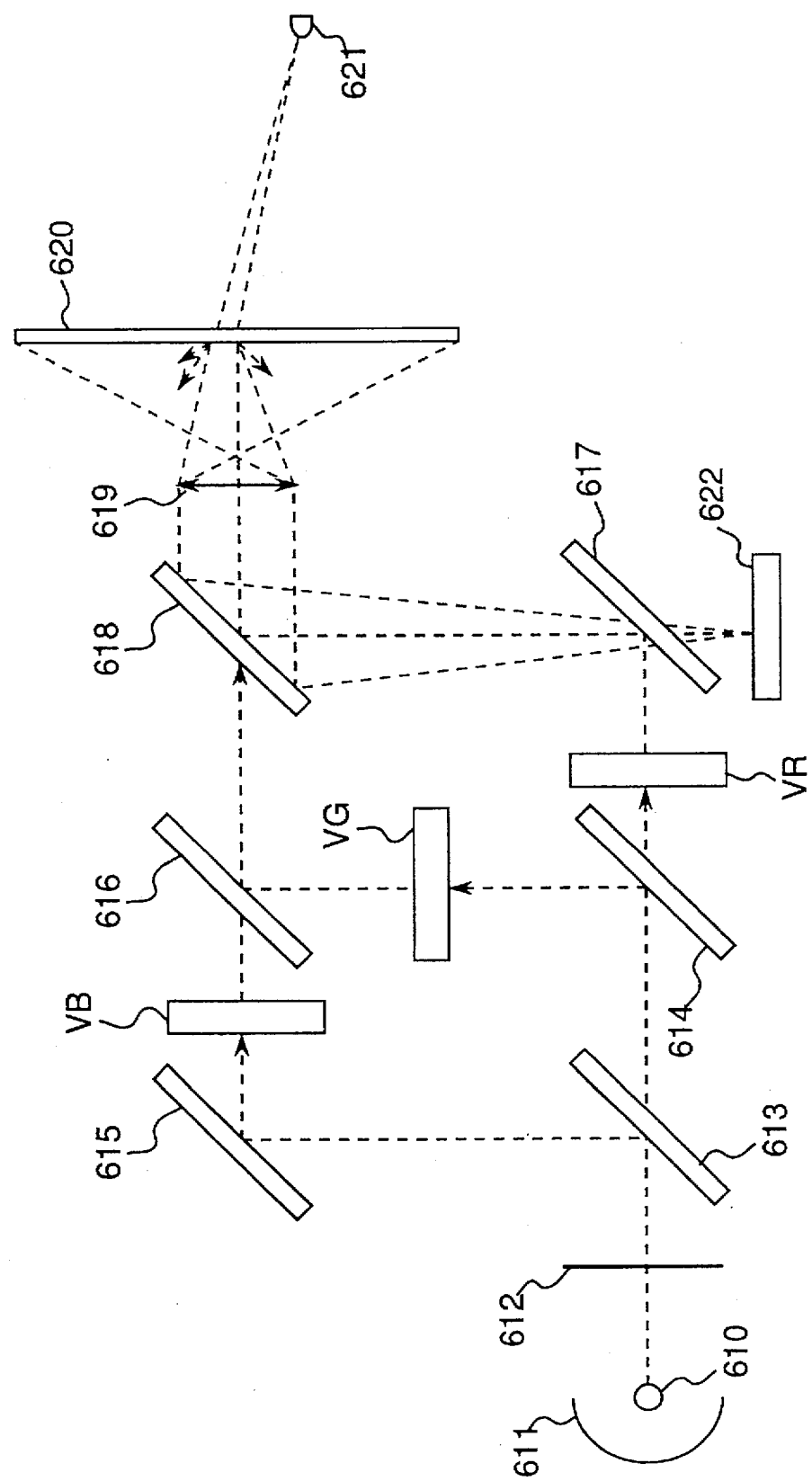
FIG. 17 is a view of a projection display apparatus of a sixth prior art.

Next, FIGS. 11A, 11B and 11C show a projection-use illumination source 103, a display image forming section 101 and a reference light emitting section 102, and a projection screen 3, respectively. The eighth embodiment is an input function-integrated projection display apparatus, and portions thereof different from those of the first embodiment are only the display image forming section 101, the reference light emitting section 102, and the projection-use illumination source 103.

The reference light emitting section 102 emits a reference light toward the projection screen 3. The reference light emitting section 102 can be implemented by an infra-red LED or a semiconductor laser device.

A display image formed by the display image forming section 101 and a reference light from the reference light emitting section 102 are projected on the projection screen 3. The reference light emitting section 102 is fixed in a specified position of the display image forming section 101. Therefore, the reference light from the reference light emitting section 102 is consistently projected in a specified position with respect to the display image.

In the present case, the reference light contains a light component different from that of the light from the light pen so that the reference light can be distinguished (discriminated) from the light emitted from the light pen. For example, the reference light has its frequency of flashing and frequency of emitting light differed from those of the light emitted from the light pen.

Therefore, when the light pen is used in the present embodiment, the reception image detecting section (for example, CCD 8) and the reception image detecting section control circuit (for example, CCD control circuit 15) detect both the luminescent spot light from the light pen and the reference light from the reference light emitting section 102. Furthermore, the CCD control circuit 15 can distinguish the luminescent spot light from the reference light based on a difference between the light component of the luminescent spot light and the light component of the reference light.

Then, the reference light keeps a specified positional relation with respect to a display light from the display image forming section 101. Therefore, the CCD 8 and the CCD control circuit 15 can utilize the position of the luminescent spot image relative to the reference light in detecting the position of the luminescent spot image relative to the display image. Therefore, according to the present embodiment, the accuracy in detecting the position of the luminescent spot image of the light pen relative to the display image projected on the projection screen 3 can be improved.

It is to be noted that the reference light may be provided at one spot, however, when a plurality of reference light spots are provided, the position of the light pen can be detected with higher accuracy. Furthermore, the reference light may be provided in a spot form, however, it may have a linear or frame-like form.

Furthermore, the reference light may be a visible light. However, when the reference light is made invisible, the operator or observer is permitted to be unconscious of the light, and therefore a more effective presentation can be achieved.

Furthermore, since the position of the reference light projected on the projection screen rarely changes immediately, the operation of detecting the position of the light pen by means of the reference light is permitted to be not always executed. Therefore, by performing detection of the position of the light pen for calibration in an initial setting stage and after the elapse of a specified time from the initial setting stage instead of always lighting the reference light, a reduced power consumption can be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A projection display apparatus comprising:

display image forming means for forming a display image to be projected on a projection screen;

luminescent spot image forming means, having an illumination source for signal input use, for forming a luminescent spot image by projecting light from the illumination source for input use on the projection screen;

image focusing means, provided between the display image forming means and the projection screen, for focusing a display image on the projection screen upon receiving light from the display image forming means, and receiving reflection light from the projection screen;

luminescent spot image extracting means for extracting light from the luminescent spot image out of a received incident light from the image focusing means;

luminescent spot image detecting means for detecting the luminescent spot image upon receiving the light from the luminescent spot image extracted by the luminescent spot image extracting means, a read frequency of the luminescent spot image detecting means being higher than a display frequency of the display image forming means; and display control means, responsive to a detection signal representing the luminescent spot image detecting by the luminescent spot image detecting means, for controlling a display image forming operation of the display image forming means based on the detection signal.

2. A projection display apparatus comprising:

an illumination source for image display use;

display image forming means, including a liquid crystal display panel provided with a first polarizing plate and a second polarizing plate attached respectively to one and the other surfaces of a liquid crystal display cell, for forming a display image to be projected on a projection screen by transmitting light from the illumination source for image display use through the liquid crystal display panel, the first polarizing plate arranged opposite to the illumination source for image display use;

luminescent spot image forming means, having an illumination source for signal input use, for forming a luminescent spot image by projecting light from the illumination source for input use on the projection screen;

image focusing means, provided between the display image forming means and the projection screen, for focusing a display image on the projection screen upon receiving light from the display image forming means, and focusing reflection light received from the projection screen on the display image forming means;

a polarizing plate for detection use for transmitting light in a direction of polarization different from a direction of polarization of the second polarizing plate upon receiving light focused on the display image forming means by the image focusing means;

luminescent spot image detecting means for detecting the luminescent spot image upon receiving light transmitted through the polarizing plate for detection use;

display control means, responsive to a detection signal representing the luminescent spot image detected from the luminescent spot image detecting means, for controlling a display image forming operation of the liquid crystal display panel based on the detection signal; and luminescent spot image focusing means, provided between the polarizing plate for detection use and the luminescent spot image detecting means, for focusing an image received from the polarizing plate for detection use through reduction on the luminescent spot image detecting means.

3. A projection display apparatus as claimed in claim 2, wherein the polarizing plate for detection use is arranged so that a direction of polarization in which the polarizing plate for detection use polarizes light is approximately perpendicular to a direction of polarization in which the second polarizing plate polarizes light.

4. A projection display apparatus comprising:

display image forming means for forming a display image to be projected on a projection screen;

luminescent spot image forming means, having an infrared light emitting section for emitting an infra-red light, for forming an infra-red light luminescent spot image on the projection screen with the infra-red light from the infra-red light emitting section;

image focusing means, provided between the display image forming means and the projection screen, for focusing a display image on the projection screen upon receiving light from the display image forming means, and focusing reflection light received from the projection screen on the display image forming means;

an optical filter which operates to receive light emitted from the image focusing means to the display image forming means, transmit light components having wavelengths in a region outside an infra-red region out of the light, and scatter light having a wavelength in the infra-red region;

luminescent spot image detecting means for detecting the luminescent spot image upon receiving the light component having a wavelength in the infra-red region scattered by the optical filter;

display control means, responsive to a detection signal representing the luminescent spot image detected from the luminescent spot image detecting means, for controlling a display image forming operation of the display image forming means based on the detection signal;

the optical filter being attached close to the display image forming means; and luminescent spot image focusing means, provided between the optical filter and the luminescent spot image detecting means, for focusing an image received from the optical filter through reduction on the luminescent spot image detecting means.

5. A projection display apparatus comprising:

display image forming means for forming a display image to be projected on a projection screen;

luminescent spot image forming means, having an illumination source for signal input use, for forming a luminescent spot image by projecting light from the illumination source for input use on the projection screen, image focusing means, provided between the display image forming means and the projection screen, for focusing a display image on the projection screen upon receiving light from the display image forming means, and focusing reflection light received from the projection screen on the display image forming means;

a low-reflectance half mirror which is provided between the image focusing means and the display image forming means, and operates to receive light emitted from the image focusing means to the display image forming means, transmit a greater part of the received light, and reflect a smaller part of the received light;

image detecting means for detecting the luminescent spot image and the display image upon receiving light reflected on the half mirror; and display control means, responsive to an image detection signal representing the luminescent spot image and the display image detected from the image detecting means, for deriving a differential image between the image detection signal and a display signal which has formed the display image on the display image forming means to extract a luminescent spot image signal representing only the luminescent spot image, and controlling a display image forming operation of the display image forming means based on the luminescent spot image signal.

6. A projection display apparatus as claimed in claim 5, further comprising:

image focusing means, provided between the half mirror and the image detecting means, for focusing a received image from the half mirror through reduction on the image detecting means.

7. A projection display apparatus as claimed in claim 5, further comprising:

light scattering means, provided between the half mirror and the image detecting means, for focusing the received image from the half mirror on the light scattering means itself.

8. A projection display apparatus as claimed in claim 5, further comprising:

a Fresnel lens provided between the half mirror and the image detecting means.

9. A projection display apparatus comprising:

an illumination source for image display use;

display image forming means, including a liquid crystal display panel provided with a first polarizing plate and a second polarizing plate attached respectively to one and the other surfaces of a liquid crystal display cell, for forming a display image to be projected on a projection screen by transmitting light from the illumination source for image display use through the liquid crystal display panel, the first polarizing plate arranged opposite to the illumination source for image display use;

luminescent spot image forming means, having an illumination source for signal input use, for forming a luminescent spot image by projecting light from the illumination source for input use on the projection screen;

image focusing means, provided between the display image forming means and the projection screen, for focusing a display image on the projection screen upon receiving light from the display image forming means, and focusing reflection light received from the projection screen on the display image forming means;

a polarizing beam splitter which reflects light in a direction of polarization different from a direction of polarization of the second polarizing plate upon receiving light emitted from the image focusing means to the liquid crystal display panel;

luminescent spot image detecting means for detecting the luminescent spot image upon receiving light reflected by the polarizing beam splitter; and display control means, responsive to a detection signal representing the luminescent spot image detected from the luminescent spot image detecting means, for controlling a display image forming operation of the liquid crystal display panel based on the detection signal.

10. A projection display apparatus as claimed in claim 9, further comprising:

reception image focusing means, provided between the polarizing beam splitter and the luminescent spot image detecting means, for focusing an image received from the polarizing beam splitter through reduction on the luminescent spot image detecting means.

11. A projection display apparatus as claimed in claim 9, wherein the illumination source of the luminescent spot image forming means is an illumination source which emits a light of which direction of polarization is random.

12. A projection display apparatus as claimed in claim 10, wherein the illumination source of the luminescent spot image forming means is an illumination source which emits a light of which direction of polarization is random.

13. A projection display apparatus as claimed in claim 9, wherein the illumination source of the luminescent spot image forming means is an illumination source which emits a circularly polarized light.

14. A projection display apparatus as claimed in claim 10, wherein the illumination source of the luminescent spot image forming means is an illumination source which emits a circularly polarized light.

15. A projection display apparatus comprising:

an illumination source for image display use;

display image forming means, including a liquid crystal display panel provided with an image display polarizing plate attached to one surface of a liquid crystal display cell, for forming a display image to be projected on a projection screen by transmitting the light from the illumination source for image display use through the liquid crystal display panel, the image display polarizing plate arranged opposite to the illumination source for image display use;

luminescent spot image forming means, having an illumination source for signal input use, for forming a luminescent spot image by projecting light from the illumination source for input use on the projection screen;

image focusing means, provided between the display image forming means and the projection screen, for focusing a display image on the projection screen upon receiving light from the display image forming means, and focusing reflection light received from the projection screen on the display image forming means;

a polarizing beam splitter which is provided between the liquid crystal display panel and the image focusing means, and operates to polarize a display image light from the liquid crystal display panel in a specified direction of polarization, output the resulting polarized light to the image focusing means, receive light emitted from the image focusing means to the liquid crystal display panel, and reflect a light component in a direction of polarization different from the specified direction of polarization;

luminescent spot image detecting means for detecting the luminescent spot image upon receiving light reflected by the polarizing beam splitter; and display control means, responsive to a detection signal representing the luminescent spot image detected from the luminescent spot image detecting means, for controlling a display image forming operation of the liquid crystal display panel based on the detection signal.

16. A projection display apparatus comprising:

display image forming means for forming a display image to be projected on a projection screen;

luminescent spot image forming means, having an illumination source for signal input use, for forming a luminescent spot image by projection light form the illumination source for input use on the projection screen;

image focusing means, provided between the display image forming means and the projection screen, for focusing a display image on the projection screen upon receiving light from the display image forming means, and receiving reflection light from the projection screen;

luminescent spot image extracting means, provided between the image focusing means and the display image forming means, for extracting light from the luminescent spot image out of a received incident light from the image focusing means;

luminescent spot image detecting means for detecting the luminescent spot image upon receiving the light from the luminescent spot image extracted by the luminescent spot image extracting means;

display control means, responsive to a detection signal representing the luminescent spot image detecting by the luminescent spot image detecting means, for controlling a display image forming operation of the display image forming means based on the detecting signal; and reference image forming means, provided in a specified position relative to the display image forming means, for outputting a reference light including a light different from the light output from the luminescent spot image forming means to the projection screen, thereby forming on the projection screen a reference image which has a fixed relative positional relation with the display image formed by the display image forming means.

17. A projection display apparatus as claimed in claim 2, comprising:

reference image forming means, provided in a specified position relative to the display image forming means, for outputting a reference light including a light different from the light outputted from the luminescent spot image forming means to the projection screen, thereby forming on the projection screen a reference image which has a fixed relative positional relation with the display image formed by the display image forming means.

18. A projection display apparatus as claimed in claim 3, comprising:

reference image forming means, provided in a specified position relative to the display image forming means, for outputting a reference light including a light different from the light outputted from the luminescent spot image forming means to the projection screen, thereby forming on the projection screen a reference image which has a fixed relative positional relation with the display image formed by the display image forming means.

19. A projection display apparatus as claimed in claim comprising:

reference image forming means, provided in a specified position relative to the display image forming means, for outputting a reference light including a light different from the light outputted from the luminescent spot image forming means to the projection screen, thereby forming on the projection screen a reference image which has a fixed relative positional relation with the display image formed by the display image forming means.

20. A projection display apparatus as claimed in claim 5, comprising:

reference image forming means, provided in a specified position relative to the display image forming means, for outputting a reference light including a light different from the light outputted from the luminescent spot image forming means to the projection screen, thereby forming on the projection screen a reference image which has a fixed relative positional relation with the display image formed by the display image forming means.

21. A projection display apparatus as claimed in claim 6, comprising:

reference image forming means, provided in a specified position relative to the display image forming means, for outputting a reference light including a light different from the light outputted from the luminescent spot image forming means to the projection screen, thereby forming on the projection screen a reference image which has a fixed relative positional relation with the display image formed by the display image forming means.

22. A projection display apparatus as claimed in claim 7, comprising:

reference image forming means, provided in a specified position relative to the display image forming means, for outputting a reference light including a light different from the light outputted from the luminescent spot image forming means to the projection screen, thereby forming on the projection screen a reference image which has a fixed relative positional relation with the display image formed by the display image forming means.

23. A projection display apparatus as claimed in claim 8, comprising:

reference image forming means, provided in a specified position relative to the display image forming means, for outputting a reference light including a light different from the light outputted from the luminescent spot image forming means to the projection screen, thereby forming on the projection screen a reference image which has a fixed relative positional relation with the display image formed by the display image forming means.

24. A projection display apparatus as claimed in claim 9, comprising:

reference image forming means, provided in a specified position relative to the display image forming means, for outputting a reference light including a light different from the light outputted from the luminescent spot image forming means to the projection screen, thereby forming on the projection screen a reference image which has a fixed relative positional relation with the display image formed by the display image forming means.

25. A projection display apparatus as claimed in claim 10, comprising:

reference image forming means, provided in a specified position relative to the display image forming means, for outputting a reference light including a light different from the light outputted from the luminescent spot image forming means to the projection screen, thereby forming on the projection screen a reference image which has a fixed relative positional relation with the display image formed by the display image forming means.

26. A projection display apparatus as claimed in claim 11, comprising:

reference image forming means, provided in a specified position relative to the display image forming means, for outputting a reference light including a light different from the light outputted from the luminescent spot image forming means to the projection screen, thereby forming on the projection screen a reference image which has a fixed relative positional relation with the display image formed by the display image forming means.

27. A projection display apparatus as claimed in claim 12, comprising:

reference image forming means, provided in a specified position relative to the display image forming means, for outputting a reference light including a light different from the light outputted from the luminescent spot image forming means to the projection screen, thereby forming on the projection screen a reference image which has a fixed relative positional relation with the display image formed by the display image forming means.

28. A projection display apparatus as claimed in claim 13, comprising:

reference image forming means, provided in a specified position relative to the display image forming means, for outputting a reference light including a light different from the light outputted from the luminescent spot image forming means to the projection screen, thereby forming on the projection screen a reference image which has a fixed relative positional relation with the display image formed by the display image forming means.

29. A projection display apparatus as claimed in claim comprising:

reference image forming means, provided in a specified position relative to the display image forming means, for outputting a reference light including a light different from the light outputted from the luminescent spot image forming means to the projection screen, thereby forming on the projection screen a reference image which has a fixed relative positional relation with the display image formed by the display image forming means.

30. A projection display apparatus as claimed in claim 15, comprising:

reference image forming means, provided in a specified position relative to the display image forming means, for outputting a reference light including a light different from the light outputted from the luminescent spot image forming means to the projection screen, thereby forming on the projection screen a reference image which has a fixed relative positional relation with the display image formed by the display image forming means.

31. A projection display apparatus comprising:

display image forming means for forming a color display image to be projected on a projection screen;

luminescent spot image forming means, having an illumination source for signal input use, for forming a luminescent spot image by projecting light from the illumination source for input use on the projection screen;

color separating means for separating light from a projecting source providing light to said display image forming means into constituent color portions and delivering said constituent color portions to said display image forming means at differing angles thereto;

image focusing means, provided between the display image forming means and the projection screen, for focusing a display image on the projection screen upon receiving light from the display image forming means, and receiving reflection light from the projection screen;

luminescent spot image extracting means for extracting light from the luminescent spot image out of a received incident light from the image focusing means;

luminescent spot image detecting means for detecting the luminescent spot image upon receiving the light from the luminescent spot image extracted by the luminescent spot image extracting means; and display control means, responsive to a detection signal representing the luminescent spot image detecting by the luminescent spot image detecting means, for controlling a display image forming operation of the display image forming means based on the detection signal.

32. The projection display apparatus as claimed in claim 31, wherein said color separating means includes dichroic mirrors, one for each constituent color portion for selectively reflecting only a respective constituent color portion, said dichroic mirrors being inclined with respect to one another.

33. The projection display apparatus as claimed in claim 31, wherein said display image forming means includes portions thereof which are designated for a particular constituent color, further comprising an array of lenses which focus the constituent colors to respective portions of said display image forming means.

34. The projection display apparatus as claimed in claim 31, further comprising a Fresnel lens between said display image forming means and said image focusing means.

35. A projection display apparatus comprising:

display image forming means for forming a color display image to be projected on a projection screen;

luminescent spot image forming means, having an illumination source for signal input use, for forming a luminescent spot image by projecting light from the illumination source for input use on the projection screen;

luminescent spot image color selecting means for varying a color of the luminescent spot image on the projection screen;

switching means for selecting the color of the luminescent spot image on the projection screen, thereby controlling said luminescent spot image color selecting means;

image focusing means, provided between the display image forming means and the projection screen, for focusing a display image on the projection screen upon receiving light from the display image forming means, and receiving reflection light from the projection screen;

luminescent spot image extracting means for extracting light from the luminescent spot image out of a received incident light from the image focusing means;

luminescent spot image detecting means for detecting the luminescent spot image upon receiving the light from the luminescent spot image extracted by the luminescent spot image extracting means; and display control means, responsive to a detection signal representing the luminescent spot image detecting by the luminescent spot image detecting means, for controlling a display image forming operation of the display image forming means based on the detection signal.

36. The projection display apparatus as claimed in claim 35, wherein said luminescent spot image color selecting means include a light source emitting light of different colors and said switching means controls an illumination state of said light source.

37. The projection display apparatus as claimed in claim 36, wherein said light source includes a plurality of light emitters, each emitting light at a different color and said switching means selects on and off states of said plurality of light emitters.

* * * * *